(12) United States Patent
Mashitani et al.

(10) Patent No.: US 6,970,290 B1
(45) Date of Patent: Nov. 29, 2005

(54) STEREOSCOPIC IMAGE DISPLAY DEVICE WITHOUT GLASSES

(75) Inventors: Ken Mashitani, Osaka (JP); Goro Hamagishi, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/668,297

(22) Filed: Sep. 25, 2000

(30) Foreign Application Priority Data

Sep. 24, 1999 (JP) ............................................ 11-271224

(51) Int. Cl.$^7$ .......................... G02B 27/22; H04N 13/04
(52) U.S. Cl. ........................ 359/462; 359/464; 359/466; 348/56; 348/54
(58) Field of Search ................................. 359/462, 464, 359/466; 348/51, 56, 42, 54, 57

(56) References Cited

U.S. PATENT DOCUMENTS

| | | | | |
|---|---|---|---|---|
| 5,315,377 A | * | 5/1994 | Isono et al. ..................... 348/51 |
| 5,900,972 A | * | 5/1999 | Chikazawa ................... 359/464 |
| 6,049,424 A | | 4/2000 | Hamagishi ................... 359/464 |
| 6,094,216 A | * | 7/2000 | Taniguchi et al. ............. 348/51 |

FOREIGN PATENT DOCUMENTS

| | | |
|---|---|---|
| EP | 0 540 137 A1 | 4/1992 |
| EP | 0 744 872 A3 | 5/1996 |
| EP | 0 744 872 A2 | 5/1996 |
| JP | 9-197344 | 7/1997 |

OTHER PUBLICATIONS

Notification of Reason(s) for Refusal dated May 25, 2004 for related application JP 9412 2X00.
Abstract of Japanese Patent Publ. No. 09152668; dated Jun. 10, 1997.
Abstract of Japanese Patent Publ. No. 09197344; dated Jul. 31, 1997.

* cited by examiner

*Primary Examiner*—Audrey Chang
(74) *Attorney, Agent, or Firm*—Arent Fox PLLC

(57) ABSTRACT

A display 1a with a shading means is divided into three areas. A shading part of the shading means shifts by ¼ of a pitch of the shading part in each of the areas. When the shading part shifts by the ¼ of the pitch, an image passes by corresponding to each of areas after shifting. An image display surface is also divided into areas by corresponding to the above division into areas, and a display order of a left eye image and a right eye image in stripe shapes is controlled for each of the areas. Shifting by the ¼ of the pitch is not provided in the H2 area, but is provided in the H1, H3 areas, and replacement of the left eye image and the right eye image is provided only in the H1 area. In this case, the right eye image passes through L1' from the H1 area and enters a right eye of the viewer, the right eye image passes through R2 from the H2 area and enters the right eye of the viewer, and the right eye image passes through R2' from the H3 area and enters the right eye of the viewer. Therefore, only the right eye image is supplied to the right eye of the viewer 2 shifting backward from an optimum viewing position D.

12 Claims, 34 Drawing Sheets

STEREOSCOPIC IMAGE DISPLAY DEVICE WITHOUT GLASSES

BACKGROUND OF THE INVENTION

1. Field of the Invention

This invention relates to a stereoscopic image display device capable of tracking a head position of a viewer and ensuring perception of a stereoscopic image by the viewer without using special glasses.

2. Description of the Prior Art

A parallax barrier system and a lenticular lens system are well known as methods for displaying a stereoscopic image without special glasses. When these systems are used for structuring a stereoscopic image display device autostereoscopic image display device, the display device is generally structured so as to be a two-eye system because of limited resolution of a liquid crystal panel. The device of the two-eye system displays an image for a right eye and an image for a left eye on every alternate vertical line on a liquid crystal display panel 200 as shown in FIG. 1. A lenticular lens and a parallax barrier (not shown) are structured so that a viewer 2 in an optimum viewing position D can observe an image for a right eye and an image for a left eye alternately with a pitch of an interval between pupils E.

In FIG. 1, R, R1, R2, R3, R4 . . . are areas for perceiving an image for a right eye, and L, L1, L2, L3 . . . are areas for perceiving an image for a left eye. When a right eye of the viewer is in the area for perceiving an image for a right eye and a left eye of the viewer is in the area for perceiving an image for a left eye, the viewer can percept a stereoscopic image. An image from a whole surface of a screen corresponding to an eye is focused in the area for perceiving an image in each of the eyes. Thus, as shown in FIG. 3, taken the R2 area in exact front of the screen as an example, a position shifted in back and forth directions a little in the R2 area can be the area for perceiving an image. The image for a right eye reaches from the whole screen to a square shaped area G, and thus the viewer can observe the image for a right eye even when being in a position of an upper or lower end of the square shaped area G. Light passing through the R2 area reaches only in a shaded area of the figure.

In accordance with the above principle, areas for perceiving an image for right and left eyes are indicated as square shaped (shaded) areas shown in FIG. 4. Therefore, as shown in FIG. 5, when the right eye of the viewer 2 is in the square area for perceiving a right eye image and the left eye of the viewer 2 is in the square area for perceiving a left eye image, the viewer 2 can perceive a stereoscopic image. On the contrary, when the eyes of the viewer are not in the above areas, the viewer can not perceive a stereoscopic image.

As a method for enlarging an area for perceiving a stereoscopic image, as disclosed in JP 9-152668, A (IPC: G03B 35/00), an image for a right eye and an image for a left eye displayed on the liquid crystal display panel 200 are replaced when a position of the viewer 2 is detected and it is found that the viewer 2 is in a reverse view area where the image for a left eye is in the right eye of the viewer and the image for a right eye is in the left eye of the viewer. In JP 9-197344 A (IPC: G02B 27/22), a liquid crystal panel or the like is used wherein a shading barrier or a parallax barrier having an aperture of an aperture shape arranged between the liquid crystal display panel and a backlight shifts by a ¼ pitch of a pitch of the shading barrier or the parallax barrier (barrier shifting). In this structure, the square areas shown in FIG. 4 shift by E/4 and each image can be observed in an outline square area, as shown in FIG. 6. That is, the areas for perceiving a right eye image R, R1, R2, R3, R4 . . . become R', R1', R2', R3', R4' . . . and the areas for perceiving a left eye image L, L1, L2, L3 . . . become L', L1', L2', L3' . . .

Thus, a stereoscopic image can be supplied on a boundary area of the right eye image and the left eye image in back and forth directions before barrier shifting. The right eye image and the left eye image can be observed and an area for perceiving a stereoscopic image is enlarged in any positions of the shaded square areas and the outline square areas in FIG. 6 by optimally controlling replacement of the right eye image and the left eye image displayed on the liquid crystal display panel 200 and shifting of the barrier and the shading plate.

In the above structure, however, stereoscopic view is not ensured when the viewer shifts a great distance backward as shown in FIG. 7. In FIG. 8, a left eye image passing through L1 from an area 2 of a liquid crystal display panel 200, a right eye image through R2 from the area B, and a left eye image through L2 from the area C are perceived by a right eye of the viewer 2, thus the viewer perceives a moiré on a boundary of the areas A, B, and C on a display surface. This is equivalent to a boundary between the areas L1, R2, and L2. Therefore, when the viewer 2 shifts a great distance in back and forth directions from a position capable of viewing a stereoscopic image, the viewer 2 perceives both of the right eye image and the left eye image, and stereoscopic view is not ensured.

SUMMARY OF THE INVENTION

This invention was made to provide a stereoscopic image display device autostereoscopic image display device capable of ensuring stereoscopic view in a position apart from an optimum viewing position with a great distance in back and forth directions. A stereoscopic image display device autostereoscopic image display device according to this invention comprises image display means for displaying a left eye image and a right eye image in alternate stripe shapes, shading means for shifting a position of a shading part for generating binocular parallax effect, and a sensor for detecting a head position of a viewer. The stereoscopic image display device includes area shifting and division control means for dividing the shading means into areas in a horizontal direction and controlling shifting of a shading part in each of the areas.

The shading means is so structured that a position of the shading part shifts by ¼ pitch of a pitch of the shading part.

When a right eye image passes between the shading parts normally arranged from one of the two areas and a right eye image passes between the shading part normally arranged from the other of the two areas, the right eye image is supplied to a right eye of the viewer in the optimum viewing position. On the other hand, a right eye image passes between the shading parts arranged by shifting by ¼ pitch from one of the two areas and a right eye image passes between shading parts arranged normally from the other of the two areas, the right eye image is supplied in a position shifted in back and forth directions from the optimum viewing position. Therefore, when a head of the viewer shifts, an right eye image is supplied to a shifted right eye of the viewer by controlling shifting of the shading part and a left eye image is supplied to a left eye of the viewer. Therefore, the viewer can perceive a stereoscopic image.

Display control means for dividing a display part of the image display means into areas by corresponding to division of the shading means into the areas and controlling a display order of the left eye image and the right eye image in stripe shapes in each of the areas depending on a head position of the viewer may be provided.

When a right eye image is outputted from a position for outputting a left eye image originally in one of the areas and the right eye image passes between the shading parts normally arranged, and a right eye image passes between the shading parts shifted by ¼ pitch from the other area, an area for supplying the right eye image shifts in back or forth direction from the optimum viewing position. Therefore, when a head of the viewer shifts, such the shifting control of the shading part and the display control of image display means ensures supply of the right eye image to the right eye of the viewer, and at that time a left eye image is supplied to the left eye of the viewer. Thus, the viewer can perceive a stereoscopic image.

The image display means may comprise a liquid crystal display panel, and the shading means may be a shading barrier arranged between the liquid crystal display panel and a light source for emitting light in a flat shape arranged on a back side of the liquid crystal display panel. The shading means may be a parallax barrier arranged on a light emission side of the image display means. The shading means may comprises a liquid crystal panel. The number of divided areas may increase as the head position of the viewer is apart from an optimum viewing position. Division into areas may be uniformly provided. Control of each of the area may be provided so as to supply an image for a dominant eye to the dominant eye of the viewer. The shading part of the shading means may be structured so that the shading part disappears in an optional area so as to display a two-dimensional image on a display area corresponding to the optional area without the shading part.

The shading means comprises a continuous shading part and a liquid crystal shutter part for turning on and off the shading part provided on both sides of the continuous shading part.

An aperture ratio equivalent to a boundary part of divided areas of the shading means may be controlled to be approximately uniform.

A liquid crystal shutter provided on both sides of the continuous shading part sandwiching the aperture part which is equivalent to the boundary part is wired so as to be in a same group of a liquid crystal shutter in an other adjacent area so that the aperture ratio is approximately uniform.

Luminescent lines and black lines are prevented by controlling so as not to change the opening ratio on the boundary part.

The foregoing and other objects, features, aspects and advantages of the present invention will become more apparent from the following detailed description of the present invention when collected conjunction with the accompanying drawings.

DESCRIPTION OF THE PREFERRED EMBODIMENT(S)

Explanation is made on embodiments of the present invention by referring to FIGS. 9–25.

(Outline)

A stereoscopic image display device autostereoscopic image display device according to the embodiment is structured so that a shading part of shading means for generating binocular parallax effect shifts by ¼ of a pitch of the shading part as shown in JP9-197344, A. With this structure, the shading means is divided into areas in a horizontal direction and the number of divided areas and whether or not the shading parts are shifted by ¼ of its pitch in each of the areas are determined, and displaying of an image on a display area corresponding to the above area is controlled.

Figure 1:
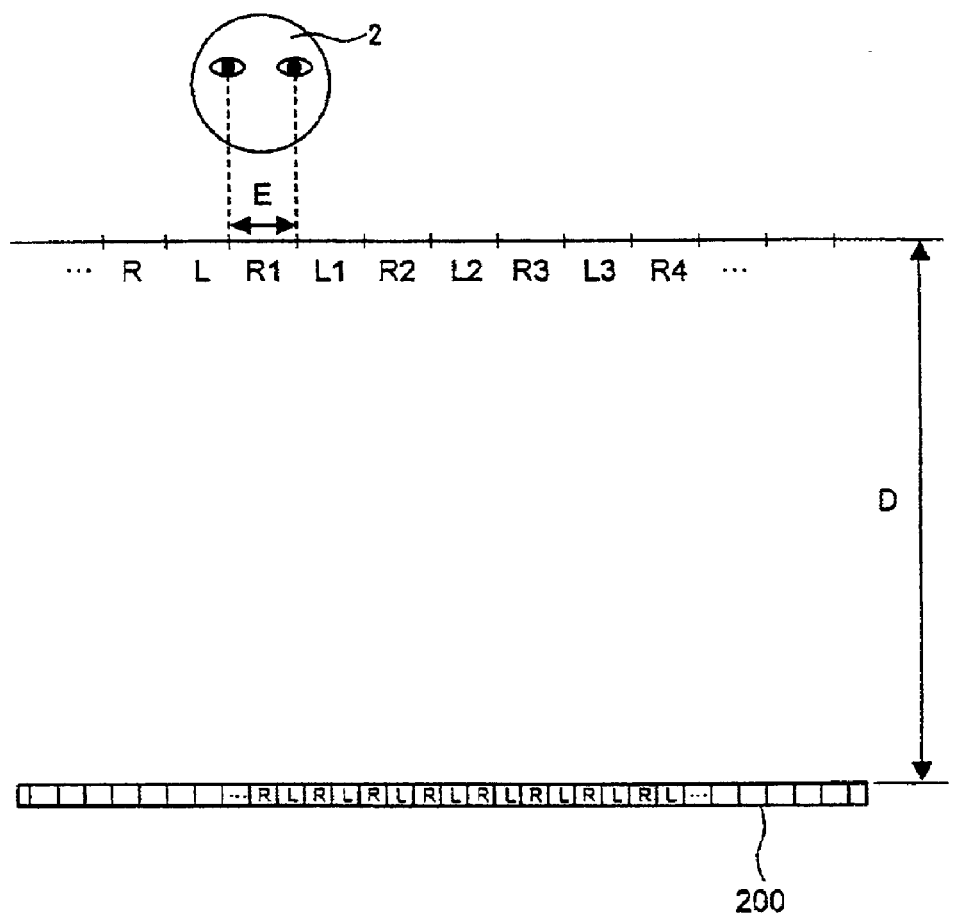
FIG. 1 is an explanatory view illustrating a distance between pupils of a viewer and an optimum viewing position from a liquid crystal display panel.
Figure 2:
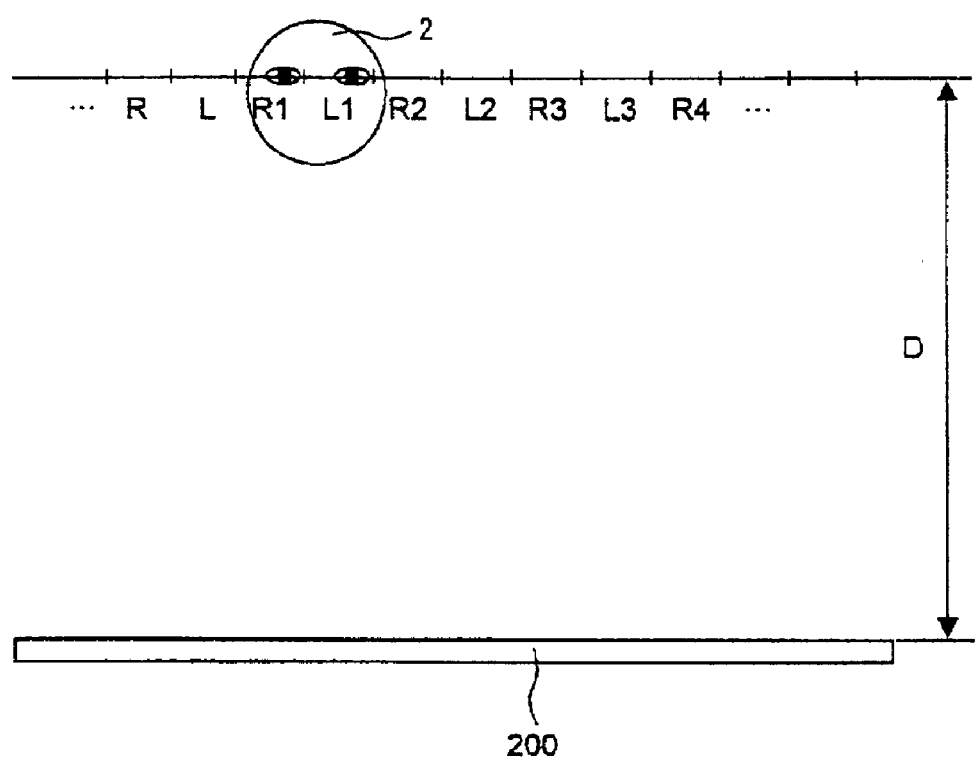
FIG. 2 is an explanatory view illustrating a viewer in the optimum viewing position.
Figure 3:
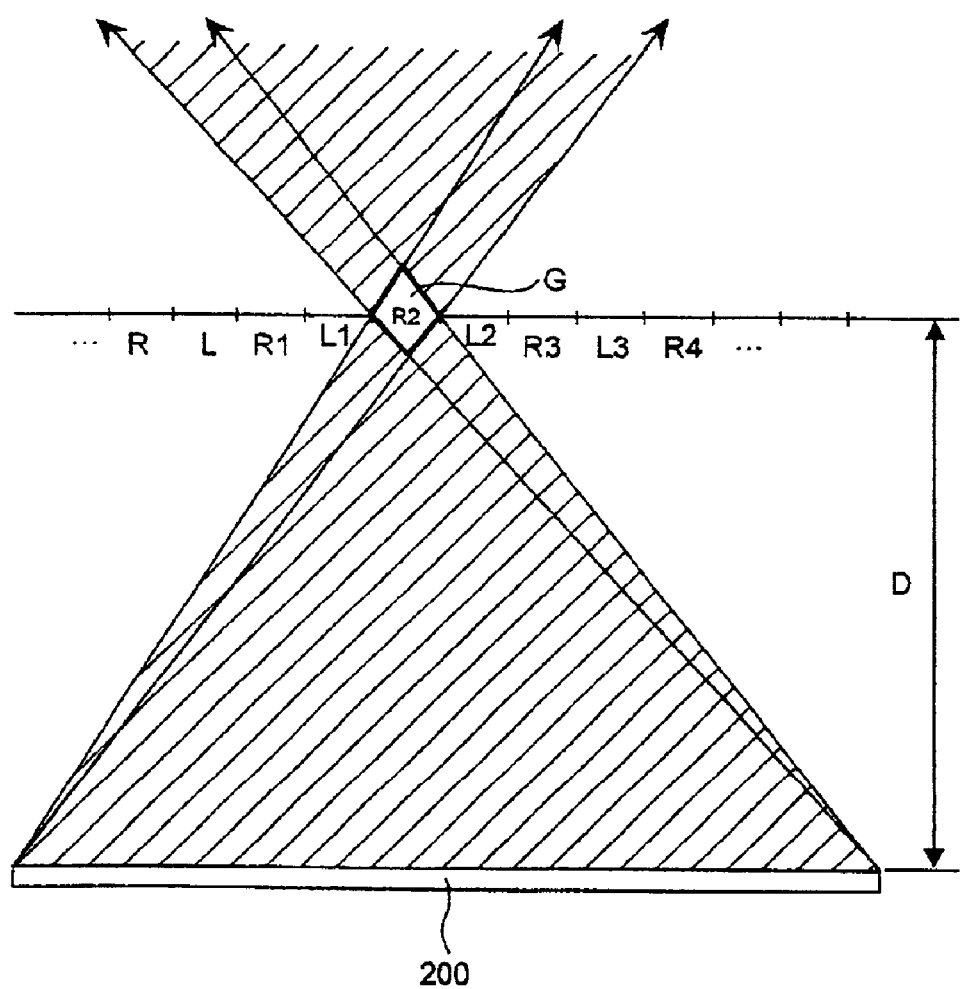
FIG. 3 is an explanatory view illustrating a square area capable of reaching a right eye image from a whole display surface and an optical path for passing through the R2 area from the whole surface of the liquid crystal display panel.
Figure 4:
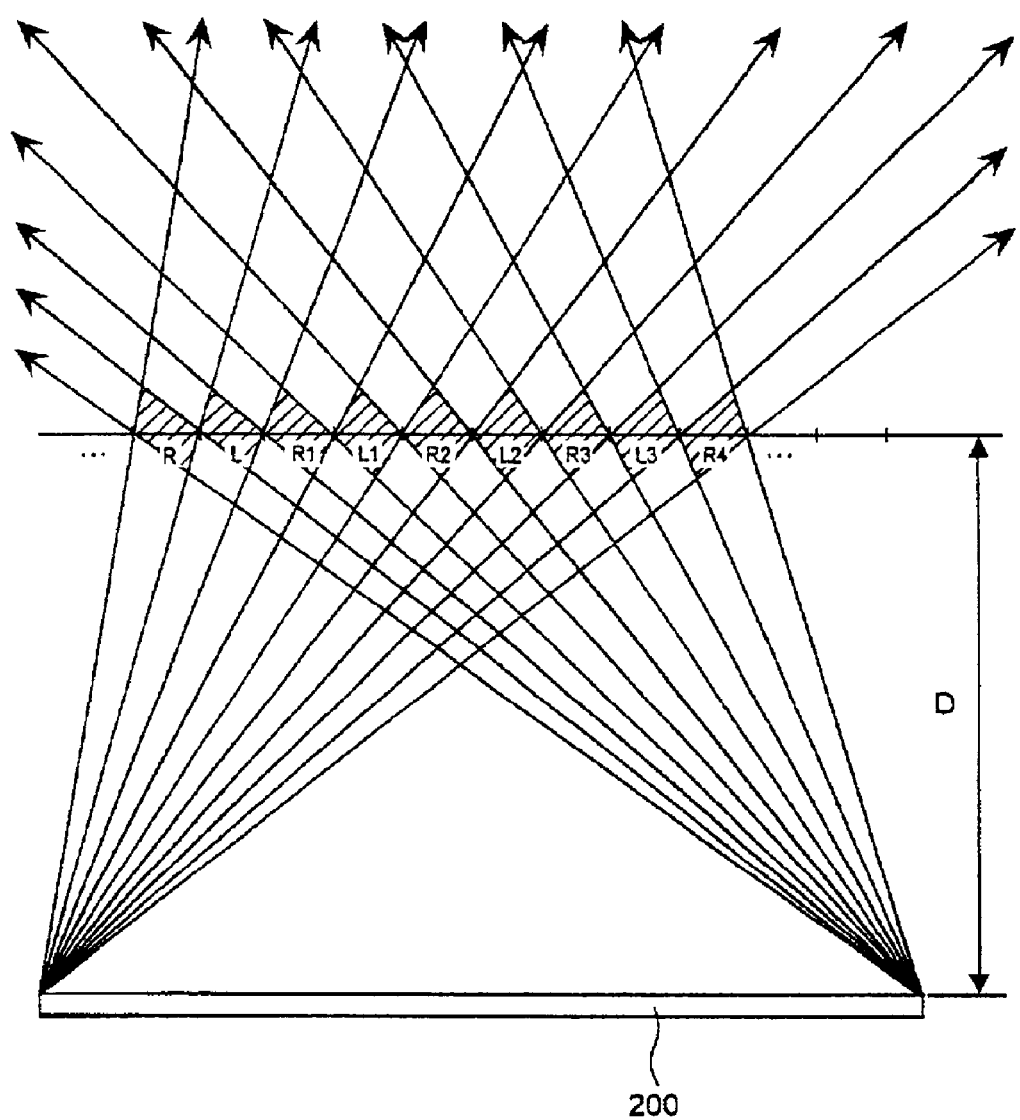
FIG. 4 is an explanatory view illustrating an area capable of viewing a right eye image or a left eye image perfectly from a whole surface of the liquid crystal display panel.
Figure 5:
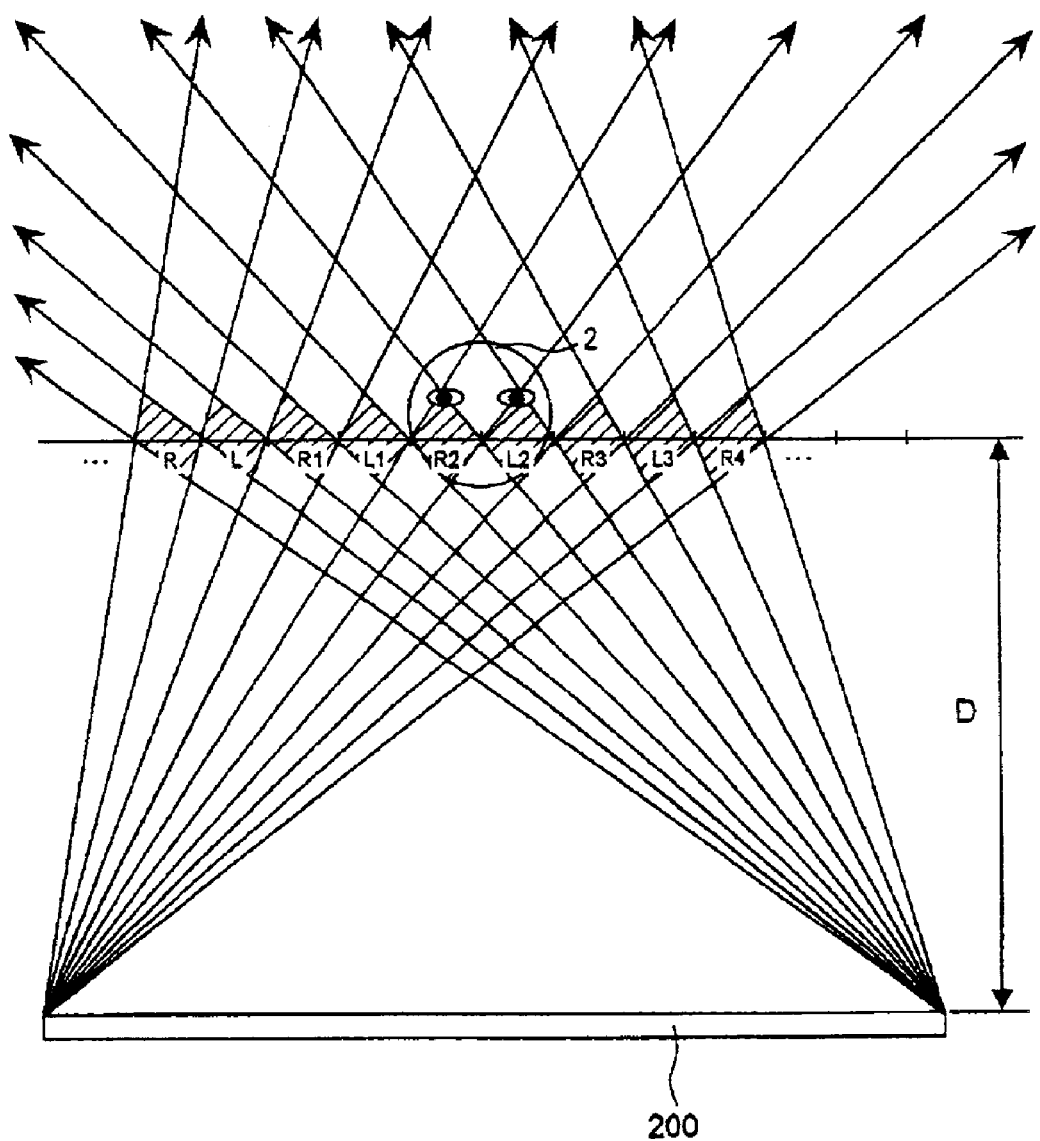
FIG. 5 is an explanatory view illustrating the viewer away from the optimum viewing position a little perceives a stereoscopic image.
Figure 6:
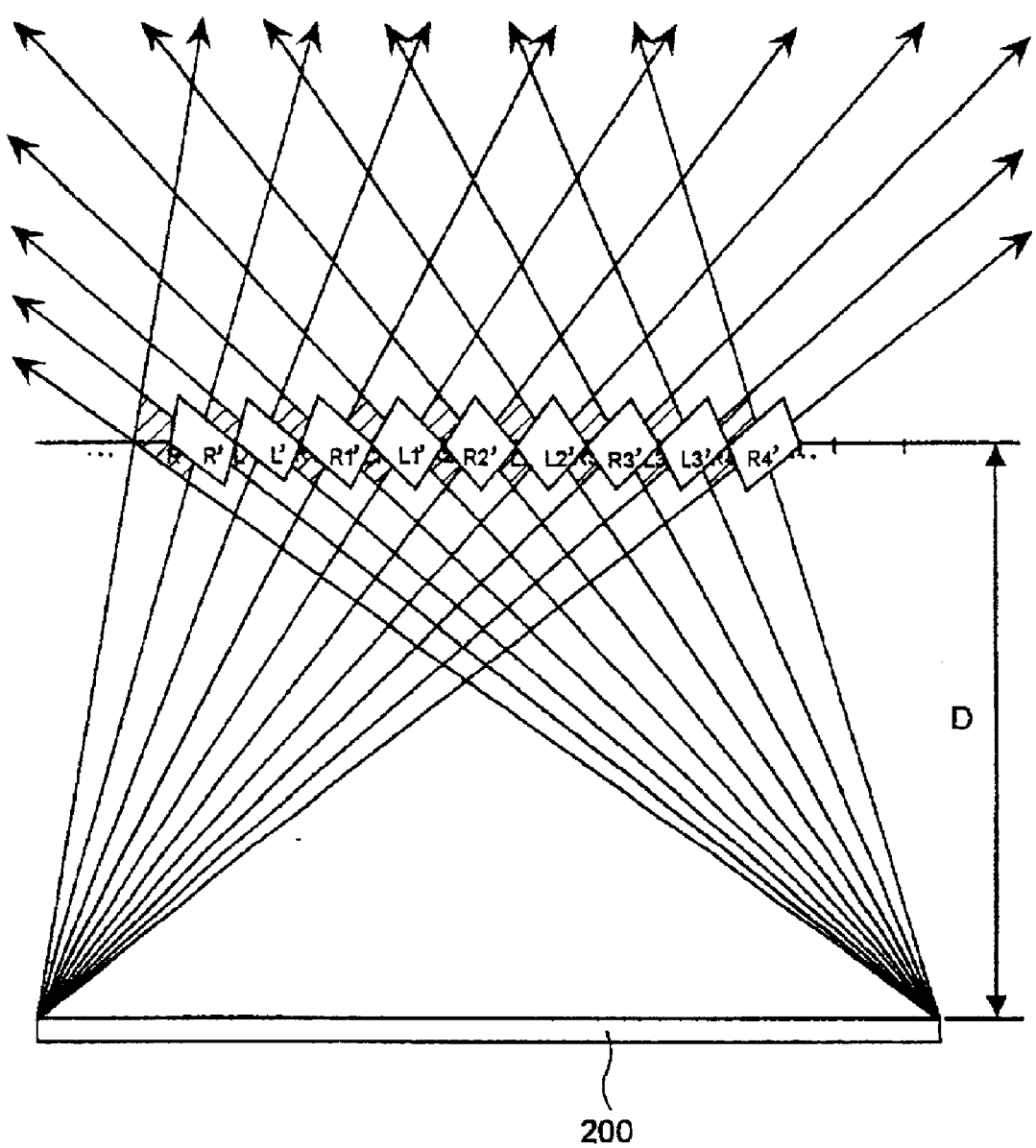
FIG. 6 is an explanatory view illustrating an area capable of viewing a right eye image and a left eye image when a shading part is shifted by ¼ pitch.
Figure 7:
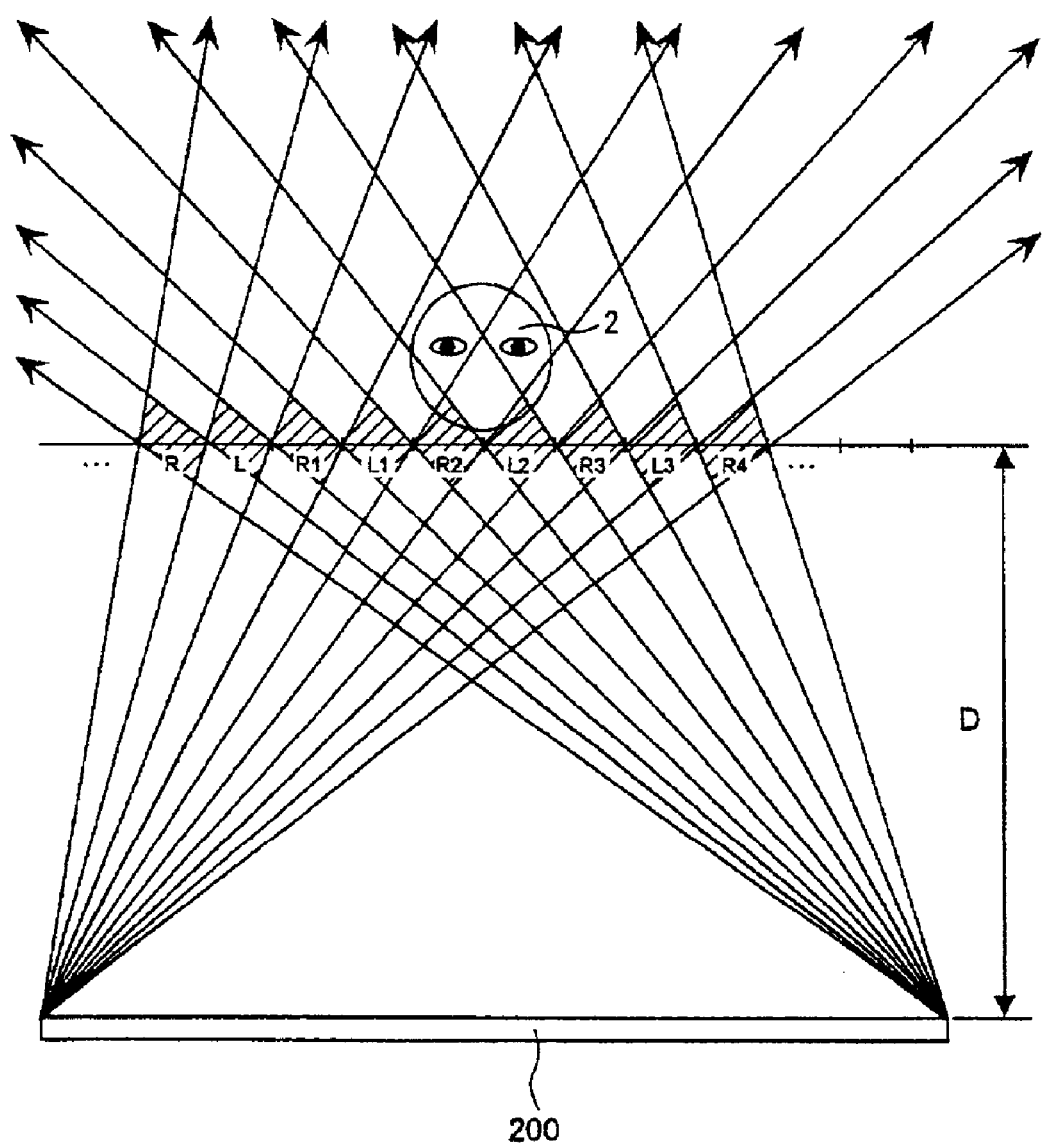
FIG. 7 is an explanatory view illustrating that the viewer away from the optimum viewing position can not perceive a stereoscopic image.
Figure 8:
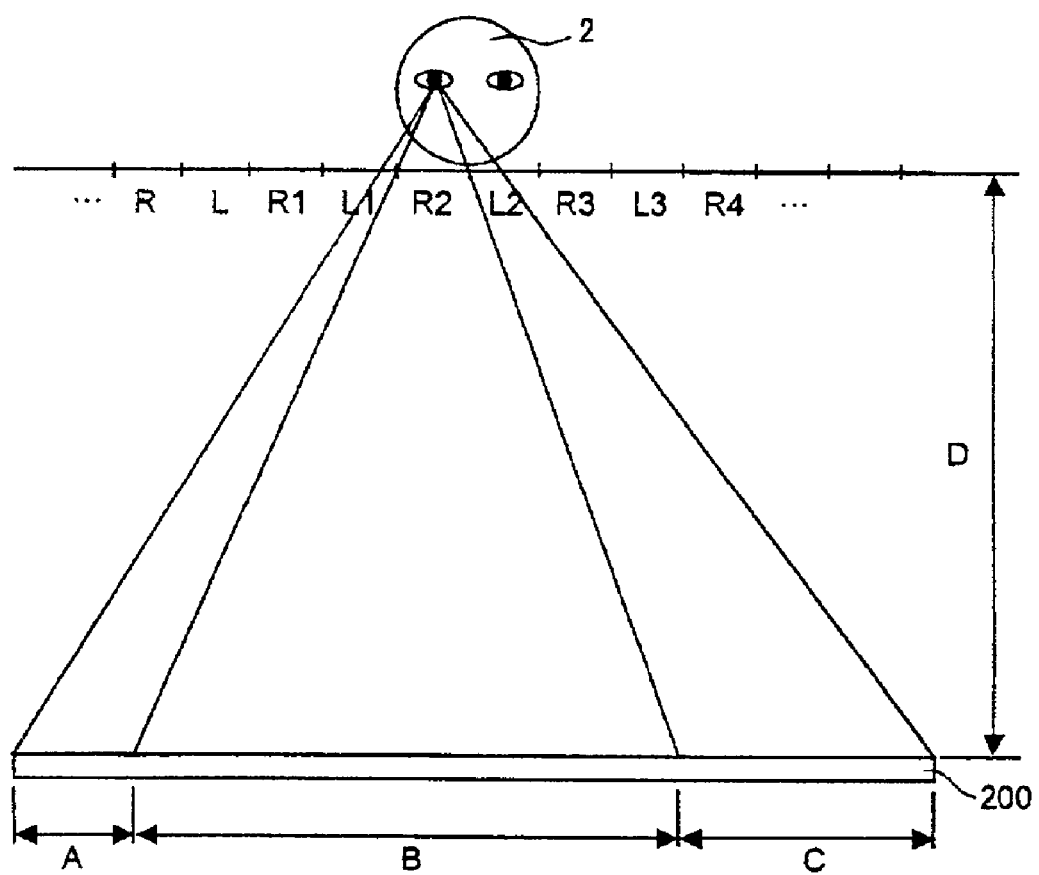
FIG. 8 is an explanatory view illustrating an image perceived with the right eye of the viewer in FIG. 7.
Figure 9:
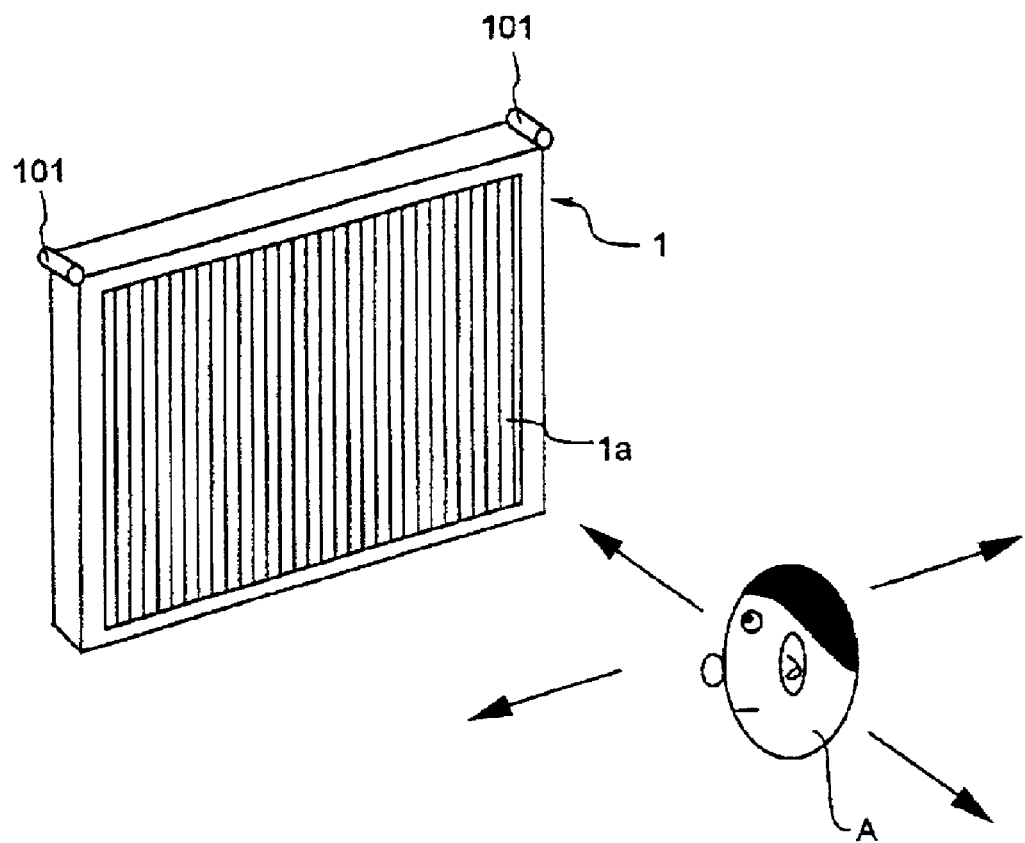
FIG. 9 is a perspective view illustrating a stereoscopic image display device autostereoscopic image display device according to the embodiment of the present invention and a viewer.
Figure 10:
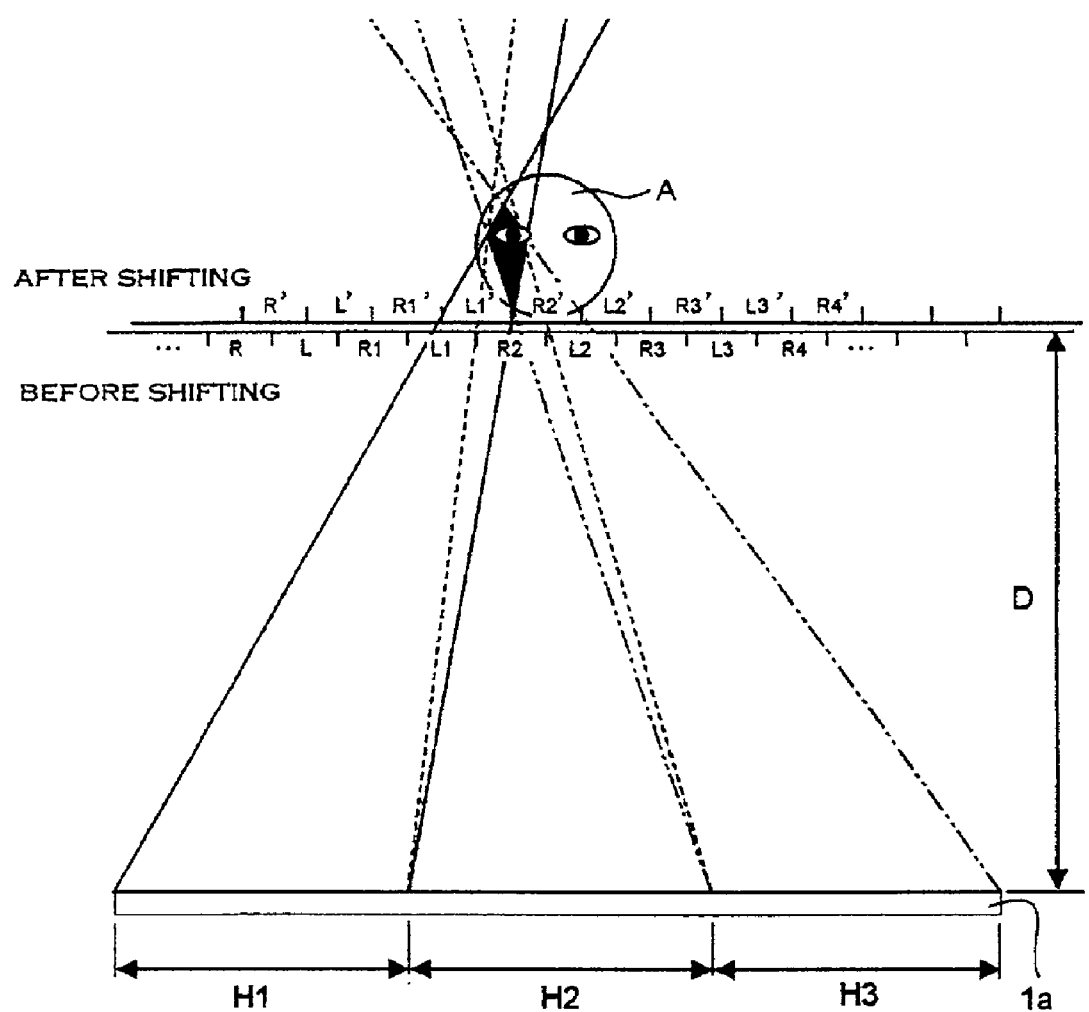
FIG. 10 is an explanatory view illustrating an area capable of perceiving a perfect right eye image from a whole display surface when the display surface with the shading means is divided into three areas and an optimum control corresponding to a position of the viewer is conducted.
Figure 11:
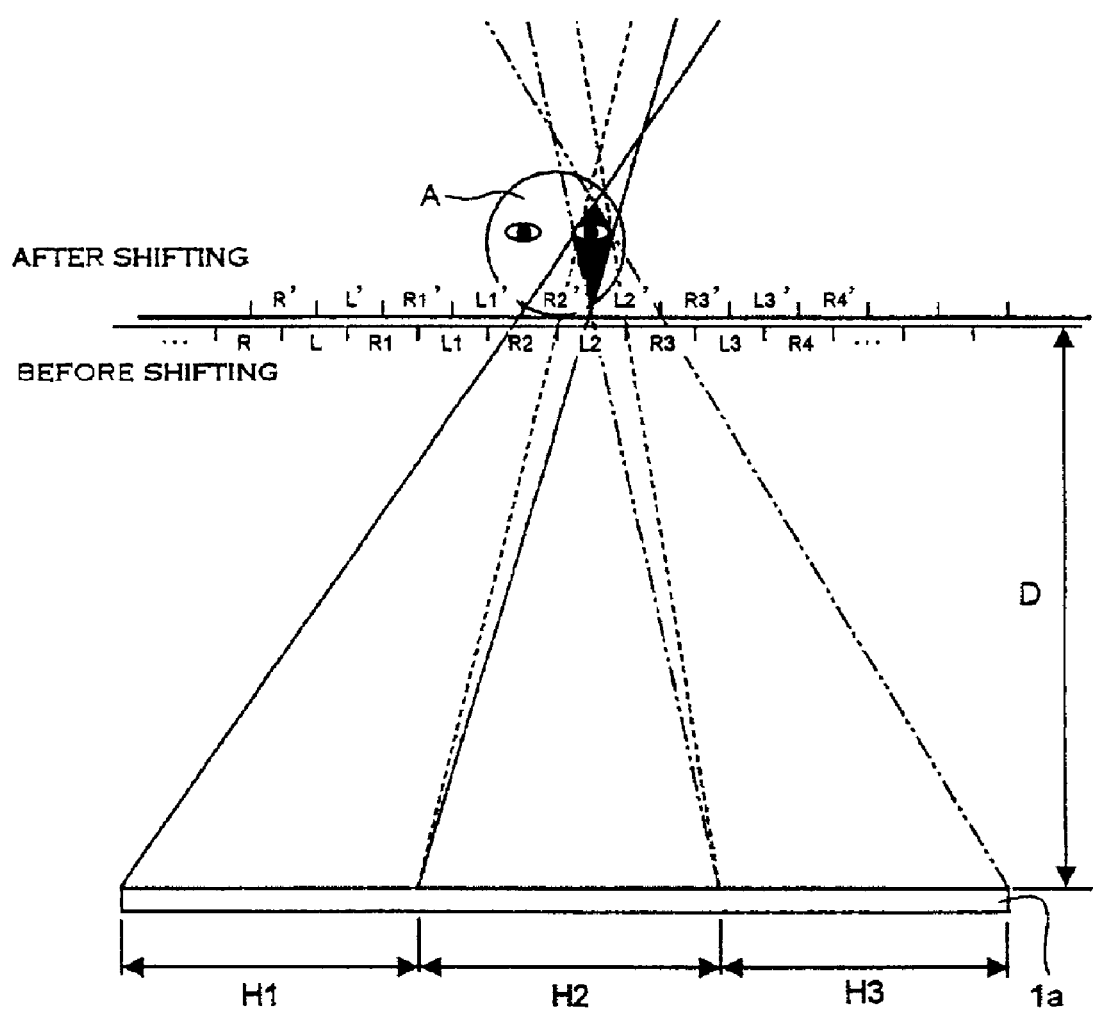
FIG. 11 is an explanatory view illustrating an area capable of perceiving a perfect left eye image from a whole display surface when the display surface with the shading means is divided into three areas and an optimum control corresponding to a position of the viewer is conducted.

FIG. 9 illustrates the viewer 2 watching a stereoscopic display device 1 autostereoscopic image display device. Sensors 101 for detecting a head position of the viewer 2 are mounted on upper ends of the stereoscopic display device 1 autostereoscopic image display device. FIGS. 10, 11 illustrate a display 1a with shading means divided into three areas of H1, H2, and H3 when the sensors 101 detect the head of the viewer 2 shifts. When the shading means does not shift by a ¼ pitch, the right and left eyes images respectively pass the areas R, L of "before shifting" in the figure. When the shading means shifts by a ¼ pitch, the right and left eye images respectively pass the areas R', L' of "after shifting" in the figure. When replacing arrangement of the right and left eye images, a left eye image passes through the R, R' areas for originally passing the right eye image, and a right eye image passes through the L, L' areas for originally passing the left eye image.

In FIG. 10, a right eye image from the H1 area passes through L1' and enters the right eye of the viewer 2, a right eye image form the H2 area passes through R2 and enters the right eye of the viewer 2, and a right eye image from the H3 area passes through R2' and enters the right eye of the viewer 2. Thus, the viewer 2 watches only the right eye image with the right eye. FIG. 11 illustrates the same control as in FIG. 10, where the shading means shifts by a ¼ pitch and the right and left eye images are replaced. The left eye image from the H1 area passes through R2' and enters the left eye of the viewer A, the left eye image from the H2 area passes through L2 and enters the left eye of the viewer 2, and the left eye image from the H3 area passes through L2' and enters the left eye of the viewer 2. Thus, the viewer 2 watches only the left eye image with the left eye. Such the control can ensure stereoscopic viewing even when the head of the viewer 2 shifts backward from an optimum viewing position.

Figure 12:
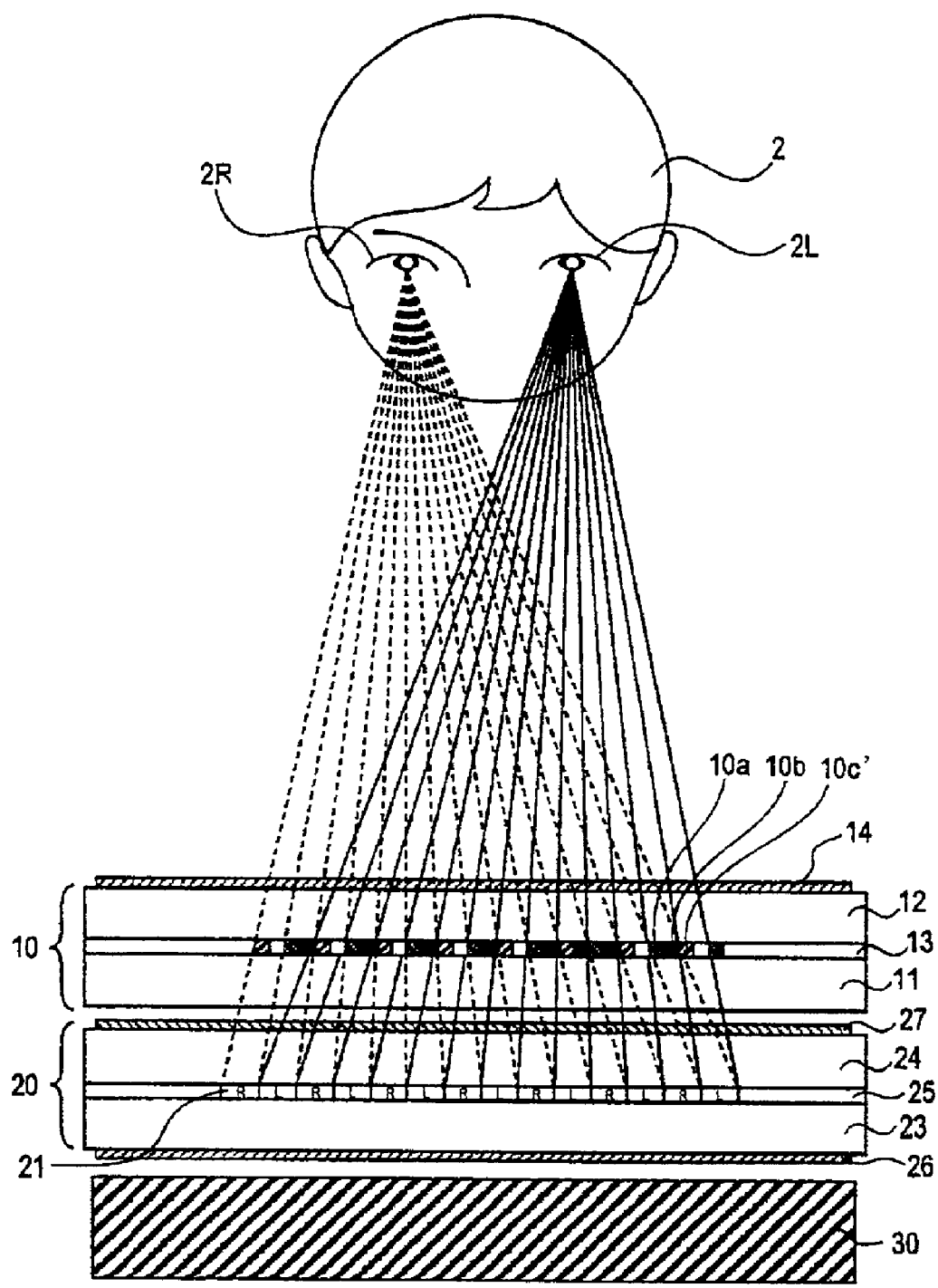
FIG. 12 is a schematic cross sectional view illustrating a structure of the stereoscopic image display device according to the invention.

The stereoscopic display device 1, as shown in FIG. 12, comprises a liquid crystal panel 20, a shading barrier 10 arranged on a viewer side of the liquid crystal panel 20, and a flat light source 30.

The shading barrier 10 is structured so that a part of the barrier can be turned on and off (appear and disappear), as described later. In the present embodiment, a TN (Twisted Nematic)-type liquid crystal display panel is used as the shading barrier 10.

The liquid crystal display panel 20 comprises a glass substrate on a light incidence side 23, a glass substrate on a light emission side 24, a liquid crystal layer 25 provided between the substrates 23 and 24, a polarizing plate on a light incidence side 26 which is attached to the glass substrate on a light incidence side 23, and a polarizing plate on a light emission side 27 which is attached to the glass substrate on a light emission side 24. The liquid crystal display panel 20 is driven by a matrix driving system, for example. A voltage is applied to a transparent pixel electrode (not shown) depending on an image signal so that an image is displayed on the liquid crystal display panel 20. Image signals supplied to the liquid crystal display panel 20 are processed and a right eye image R and a left eye image L are alternately displayed every other vertical line.

The shading barrier 10 of the TN-type liquid crystal display panel arranged on the light emission side of the liquid crystal panel 20 includes a liquid crystal layer 13 between two glass substrates 11, 12 and a polarizing plate 14 on the light incidence side 14 on a side of the viewer 2. Further, the polarizing plate 27 of the liquid crystal display panel 20 for forming an image is also used as a polarizing plate on a light incidence side of the shading barrier 10. The shading barrier 10 composed of the TN-type liquid crystal display panel is so constructed that a transparent electrode of ITO or the like is patterned on the inner surfaces of the glass substrates 11 and 12, and the shading part of the barrier can be electrically turned on and off. Further, the shading barrier 10 has a function of shifting the shading part by ¼ of its pitch. For example, in order to realize the function, the transparent electrode for turning the barrier on and off is subdivided to make the shifting of the shading part possible. The barrier is turned on so that one aperture corresponds to two pixels displayed on the liquid crystal display panel 20. Light passing through the liquid crystal display panel 20 is divided into light for a left eye and light for a right eye, so that the light for a left eye and the light for a right eye respectively enter the left eye 2L and the right eye 2R of the viewer 2.

Figure 13:
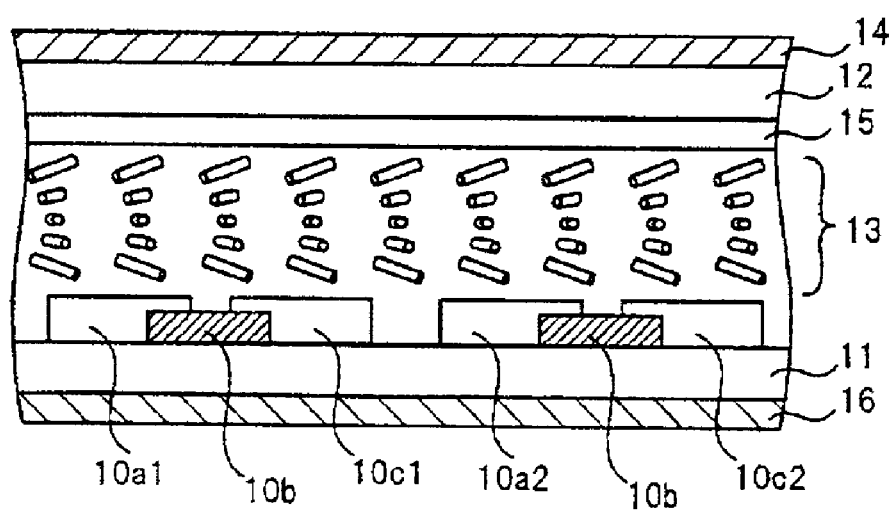
FIG. 13 is a cross sectional view illustrating one example of a shading barrier used in the invention.

FIG. 13 is a cross sectional view illustrating one example of a structure of the shading barrier 10 defined by the liquid crystal panel described above. The liquid crystal display panel is provided with the liquid crystal layer 13 arranged between the two glass substrates 11 and 12. The polarizing plates 14 and 16 are respectively provided on the outer surfaces of the glass substrates 11 and 12. The polarizing plate on the side of the liquid crystal panel 20 for displaying images out of the two polarizing plates 14 and 16 can be used commonly with the polarizing plate of the liquid crystal display panel 20. The polarization pates 14, 16 are attached so that the polarization axes are orthogonal. In the figure, a polarizing plate is used commonly for the shading barrier and the liquid crystal display panel for image display 20. A transparent electrode 15 is formed over an inner surface of the glass substrate 12. The transparent electrode 15 comprises ITO, for example.

A continuous shading part 10b is formed with black pigment, areas 10a1, 10a2 as shading parts only in a first state and areas 10c1, 10c2 as shading parts only in a second state are formed with transparent electrodes on an other glass substrate 11. In an actual state, as shown in the figure, the transparent electrodes and the continuous shading part are formed so as to superimpose with each other without a clearance.

When a voltage is not applied to all the transparent electrodes, a polarization axis of the light selected by the polarizing plate 422 is rotated by 90° in accordance with rotation of liquid crystals in the liquid crystal layer 13, and is emitted through the polarizing plate 14. At that time, light trying to be incident to the continuous shading part 10 is shaded.

The pitch (Q) is formed so that a pair of the continuous shading part 10b and either of the transparent electrodes 10a1(10a2), 10c1(10c2) correspond to two pixels of the liquid crystal panel 20 in order to ensure stereoscopic viewing autostereoscopic image display device when the shading part is on. Either of the transparent electrodes 10a1 (10a2) or 10c1(10c2) for ensuring shifting of the shading part is turned on by corresponding to the position of the viewer 2. A width of the transparent electrodes 10a1 (10a2) and 10c1(10c2) is formed so that a part not superimposing with the continuous shading part 10b is Q/4. Therefore, the shifting of the shading part by Q/4 is ensured by switching the ON/OFF of the transparent electrodes. The liquid crystal shutter comprises the transparent electrodes 10a1 (10a2) and 10c1(10c2).

(Explanation on Detailed Embodiment)

Figure 14:
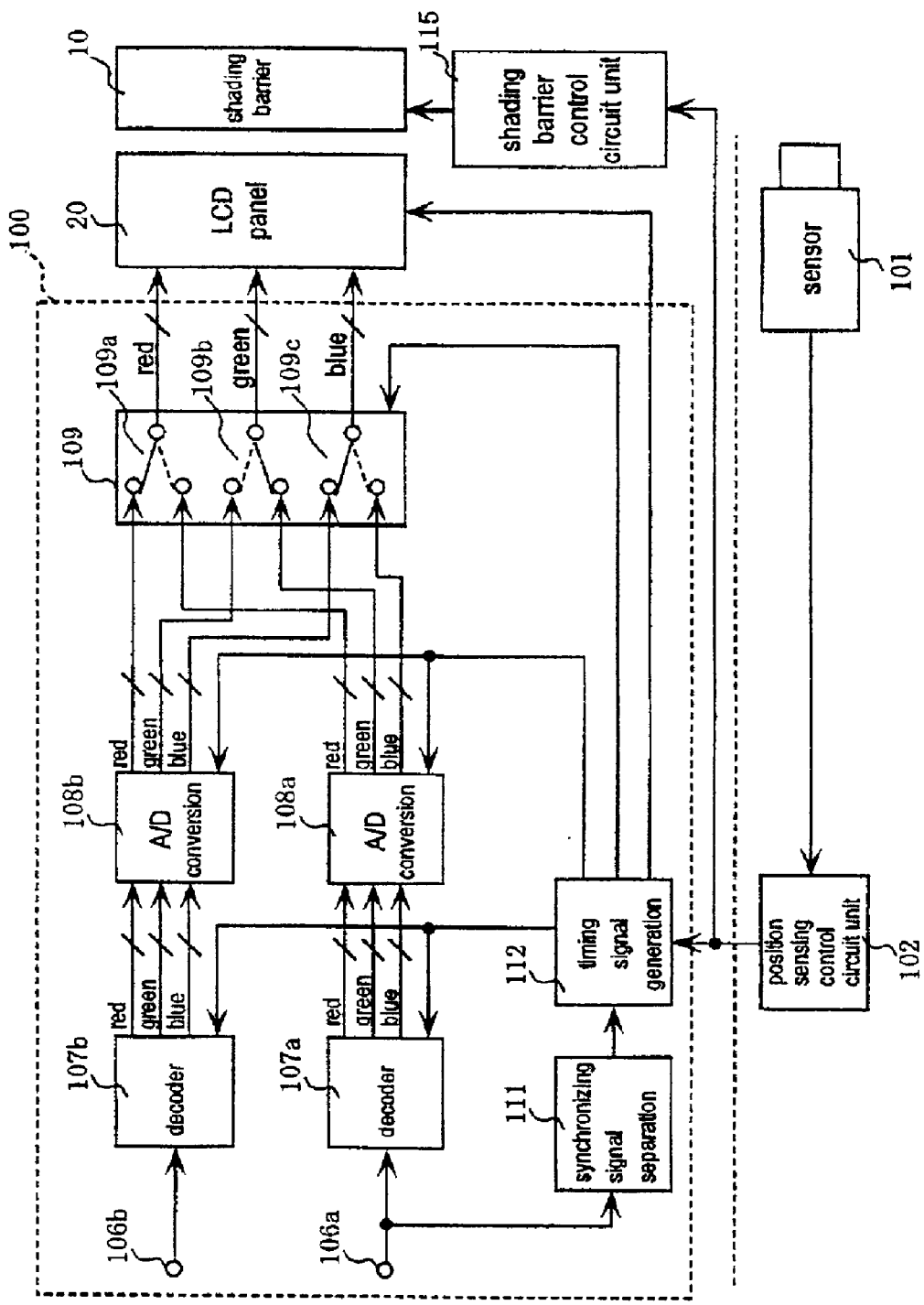
FIG. 14 is a block diagram illustrating a structure of the stereoscopic image display device autostereoscopic image display device according to the embodiment.

FIG. 14 is a block diagram illustrating a structure of the stereoscopic image display device autostereoscopic image display device. In this block diagram, the device according to the invention is applied to color display.

Output from the sensor 101 for detecting a position of the viewer 2 is fed to a position sensing and controlling circuit 102, the position sensing and controlling circuit 102 detects a head position of the viewer 2 on the basis of the output from the sensor 101, and feeds a control signal corresponding to the position to a display signal generation circuit 100 and a shading barrier dividing control circuit 115.

The display signal generating circuit 100 generates an image signal for a left eye and an image signal for a right eye and supplies them to the liquid crystal display panel 20. A right eye image and a left eye image are displayed in every alternate vertical line on the liquid crystal display panel 20. As basic operation, the display signal generating circuit 100 switches supply of an image signal for a left eye and an image signal for a right eye on the basis of a control signal from the position sensing and controlling circuit 102. In addition, the display signal generating circuit 100 determines the number of display division on the basis of the control signal and controls switching between the image signal for a left eye and the image signal for a right eye in each of the divided areas.

Explanation is made on a concrete structure of the display signal generating circuit 100. An image signal for a left eye which is a composite signal containing a brightness signal Y and a color-difference signal C is fed to a first input terminal 106a, and an image signal for a right eye which is a composite signal containing a brightness signal Y and a color-difference signal C is fed to a second input terminal 106b. The image signal for a left eye is converted into primary color signals of red, green, and blue by a first decoder 107a, and the image signal for a right eye is converted into primary color signals of red, green, and blue by a second decoder 107b. Each of the primary color signals is converted into digital data by first and second A/D converters 108a, 108b and is fed to a multiplexer 109.

The multiplexer 109 comprises a first switch part 109a for selecting either of two red primary color data inputted from the first and second A/D converters 108a, 108b, a second switch part 109b for selecting either of two green primary color data inputted from the first and second A/D converters 108a, 108b, and a third switch part 109c for selecting either of two blue primary color data inputted from the first and second A/D converters 108a, 108b. The multiplexer 109 switches between the following first and second selection states. In the first selection state (shown with a full line), the first switch 109a selects the red primary color data for a right eye from the second A/D converter 108b, the second switch 109b selects the green primary color data from the first A/D converter 108a, and the third switch 109c selects the blue primary color data for a right eye from the first A/D converter 108b. In the second selection state (shown with a broken line), the first switch 109a selects the red primary color data for a left eye from the first A/D converter 108a, the second switch part 109b selects the green primary color data for a right eye from the second A/D converter 108b, and the third switch part 109c selects the blue primary color data for a right eye from the second A/D converter 108a. The first and second selection states are basically switched every first and second data output period within one horizontal scanning period on the liquid crystal display panel 20 (every one dot clock).

A synchronizing signal separation circuit 111 separates horizontal and vertical synchronizing signals from the left eye signal inputted to the first input terminal 106a, and feeds the synchronizing signal to a timing signal generating circuit 112. The timing signal generating circuit 112 generates a timing signal for controlling timing for operating the first and second decoders 107a, 107b, the first and second A/D converters 108a, 108b, the multiplexer 109, and the liquid crystal display panel 20.

A shading barrier dividing control circuit 115 controls ON/OFF of the liquid crystal shutter part of the shading barrier 10, and controls positions of the shading part and a light transmitting part of the shading barrier 10. The shading barrier 10 comprises the light transmitting part and the shading part of vertical strip shapes. In this embodiment, a parallax barrier arranged between the liquid crystal display panel 20 and the viewer 2 is used. It may be possible to use a structure for arranging the parallax barrier between the liquid crystal display panel 20 and a light source (not shown) for emitting light in a flat shape. A pitch of the shading part of the shading panel 10 is determined by a pixel pitch of the liquid crystal display panel 20 to be used. A width of the liquid crystal shutter part is the above described ¼ pitch so that the light transmitting part and the shading part of the shading barrier 10 shift by a ¼ of a pitch of the shading part.

The position sensing and controlling circuit 102 outputs a first control signal to the timing generation circuit 112 and the shading barrier division control circuit 115 when the head position of the viewer 2 is in a normal view area of the liquid crystal display panel 20, and outputs a second control signal to the timing generation circuit 112 and the shading barrier division control circuit 115 when the head position of the viewer 2 is in a reverse view area of the liquid crystal display panel 20 (the viewer watches a left eye image with the right eye and watches a right eye image with the left eye), and outputs a third control signal to the timing generation circuit 112 and the shading barrier division control circuit 115 when the head position of the viewer 2 is in an area shifting by approximately E/4 to 3E/4 (a moire area).

Further, the position sensing and controlling circuit 102 outputs a fourth control signal to the timing generation circuit 112 and the shading barrier division control circuit 115 when the head position of the viewer 2 is out of the optimum positions in back and forth directions by more than a predetermined distance. The fourth control signal differs depending on whether the head position of the viewer 2 is shifted in a back or forth direction from the optimum positions and a shifting amount (a distance from the optimum positions). On the basis of the differences, a combination of the number of area division, whether or not the shading part of each of the areas shifts by ¼ pitch, whether or not the order of display of a right eye image and a left eye image in each of the areas switches. Regarding this, detailed explanation is made later. When the viewer 2 is in a normal view area and the first control signal is fed to the timing generation circuit 112, the timing generation circuit 112 switches between the first selection state and the second selection state of the multiplexer 109 so as to form pixel arrangement for a normal view area on the liquid crystal display panel 20. That is, an image of such as a first red pixel (a right eye image), a first green pixel (a left eye image), a first blue pixel (a right eye image), a second red pixel (a left eye image), a second green pixel (a right eye image), a second blue pixel (a left eye image), and a third red pixel (a right eye image) . . . is formed. When the first control signal is fed to the shading barrier division control circuit 115, the shading barrier division control circuit 115 feeds a liquid crystal shutter ON/OFF control signal to the shading barrier 10 so as to form the light transmitting part and the shading part for the normal view area on the shading barrier 10.

When the viewer 2 is in a reverse view area and the second control signal is fed to the timing generation circuit 112, the timing generation circuit 112 switches between the first selection state and the second selection state of the multiplexer 109 so as to form pixel arrangement for a reverse view area on the liquid crystal display panel 20. That is, an image of such as a first red pixel (a left eye image), a first green pixel (a right eye image), a first blue pixel (a left eye image), a second red pixel (a right eye image), a second green pixel (a left eye image), a second blue pixel (a right eye image), a third red pixel (a left eye image) . . . is formed. Positions of the light transmitting part and the shading part of the shading barrier 10 are set to be the same as the normal view area. Change of image display as above is referred as "left and right image switch".

When the viewer 2 is in an area shifted by approximately E/4–3E/4 from a normal view area (a moire area) and the third control signal is fed to the timing generation circuit 112, the timing generation circuit 112 switches the first selection state and the second selection state of the multiplexer 109 so as to form pixel arrangement of the same as for the normal view (for example, the viewer 2 shifts in a right direction of the figure) or as for the reverse view on the liquid crystal display panel 20 (for example, the viewer 2 shifts in a left direction of the figure). When the third control signal is fed to the shading barrier division control circuit 115, the shading barrier division control circuit 115 feeds a liquid crystal shutter ON/OFF control signal to the shading barrier 10 so that the shading part of the shading barrier 10 shifts in an opposite direction to the direction of the viewer 2 shifting by ¼ pitch of a distance the shading part shifts from the normal view area. Shifting of the shading part by ¼ pitch is referred to "barrier shifting".

Explanation is made on a case where the viewer 2 is out of the optimum viewing position in a back or forth direction and a fourth control signal is outputted to the timing generating circuit 112 and the shading barrier division control circuit 115. When the fourth control signal is outputted, the shading barrier 10 is divided into areas in a horizontal direction and execution or non-execution of barrier shifting is set in each of the areas. The shading barrier division control circuit 115 conducts control of the setting. The liquid crystal display panel 20 is divided into areas corresponding to the above areas, and whether or not replacing left and right images is set in each of the areas. The timing generation circuit 112 conducts control of the setting. Combination (controlling) of whether executing the left and right image replacing and whether executing the barrier shifting is conducted in accordance with tables 1–4 described later.

[Dividing a Liquid Crystal Display Panel into Two Areas]
(A Head Position of the Viewer 2 is out of an Optimum Viewing Position Backward)

Figure 15:
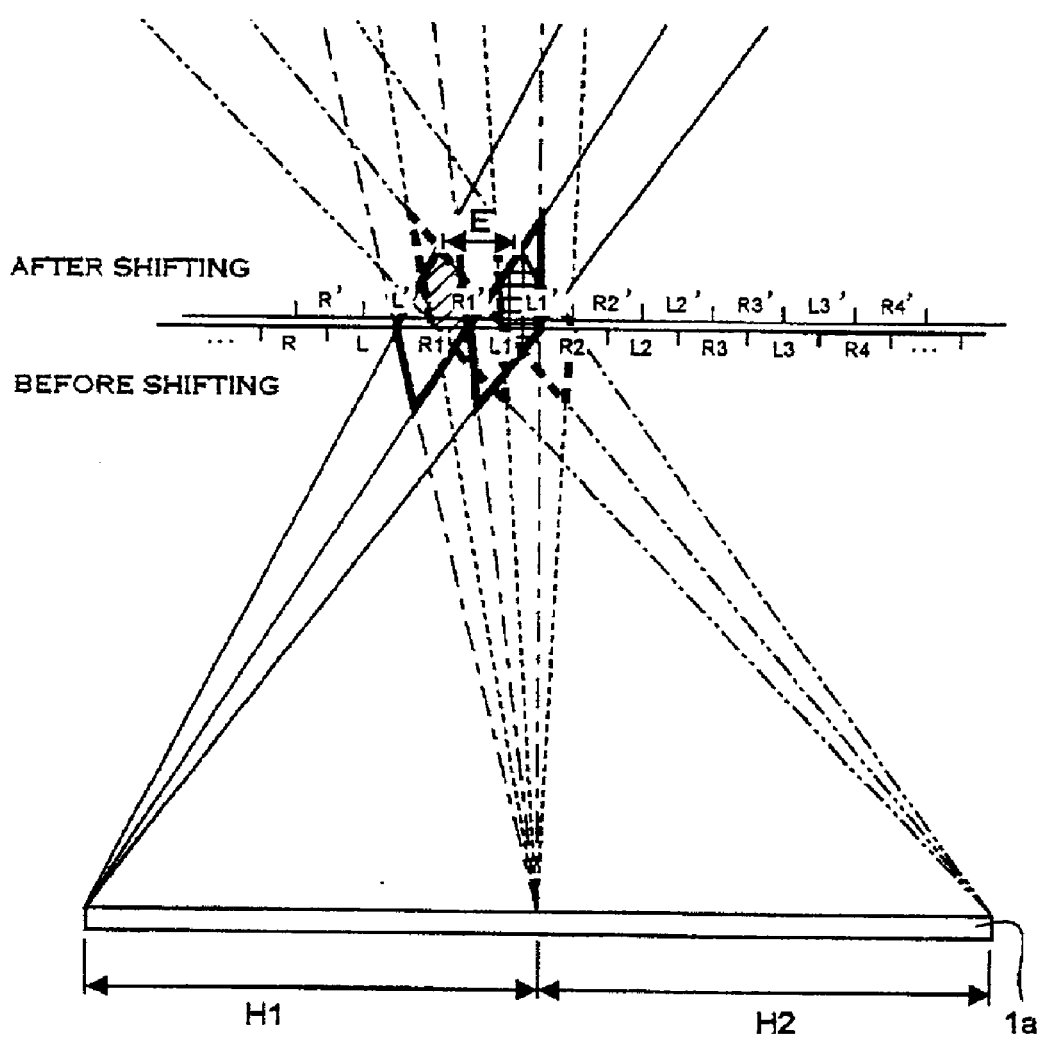
FIG. 15 is an explanatory view illustrating an area capable of perceiving perfect right eye and left eye images from a whole display surface when the display surface with the shading means is divided into two areas and an optimum control corresponding to the viewer shifting backward from the optimum viewing position is conducted.

FIG. 15 illustrates that the barrier is not shifted in the H1 area of the display 1a with the shading means, the barrier is shifted in the H2 area, and the left and right images are not replaced in both of the areas. In this case, a right eye image passing through R1 from the H1 area is perceived in a square indicated with a bold line on the left side of the figure, and a right eye image passing through R1' from the H2 area is perceived in a square indicated with a broken bold line on a left side of the figure. Therefore, a right eye image is perceivable simultaneously from both the H1 and H2 areas in a shaded area indicated in the figure. A left eye image passing through L1 from the H1 area is perceived in a square indicated with a bold line on the right side of the figure, and a left eye image passing through L1' from the H2 area is perceived in a square indicated with a broken bold line on a right side of the figure. Therefore, a left eye image is perceivable simultaneously from both the H1 and H2 areas in a check area indicated in the figure.

Figure 16:
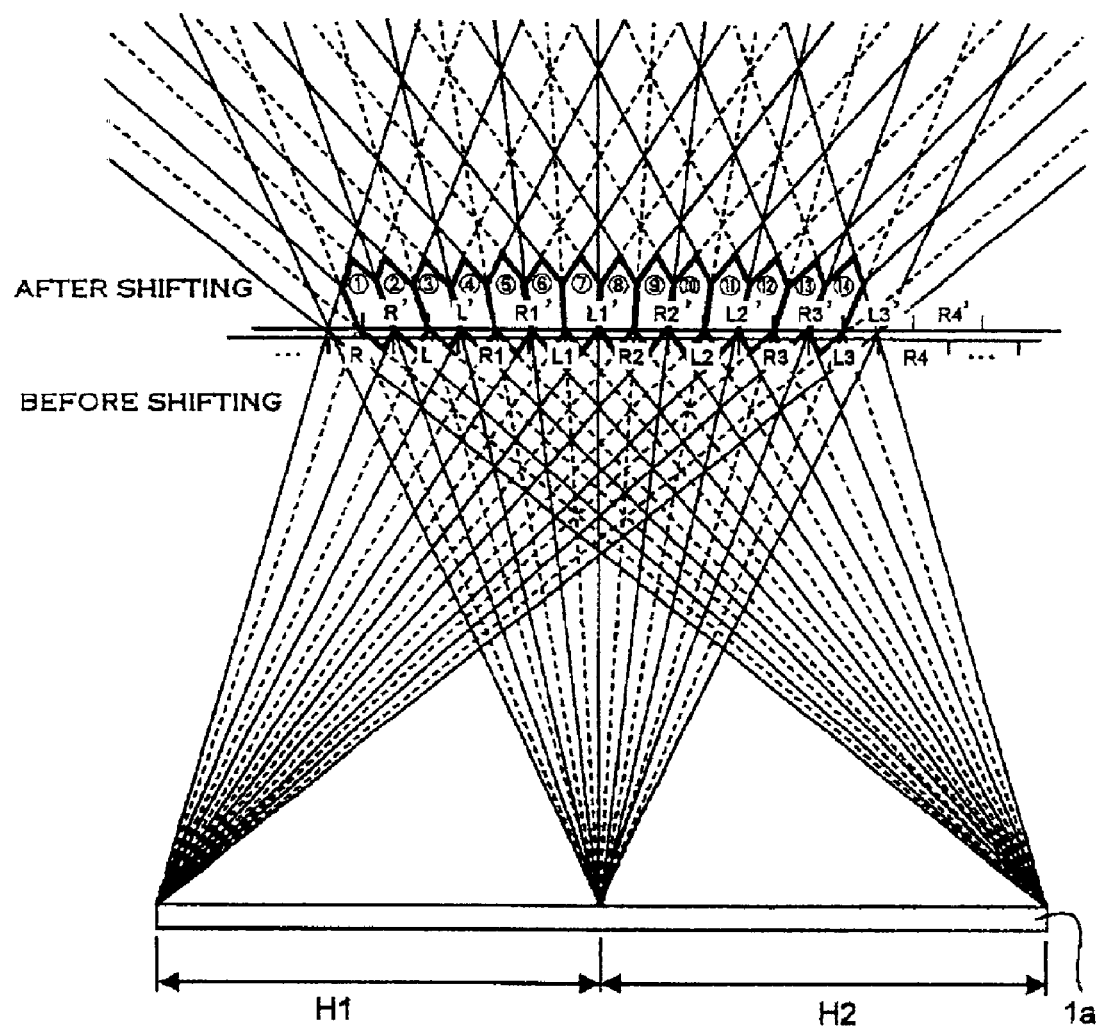
FIG. 16 is an explanatory view illustrating an outline polygon of a bold line indicating an area capable of perceiving a right eye image simultaneously from the two areas of FIG. 15.

FIG. 16 illustrates an area capable of perceiving a right eye image from the H1 area and the H2 area simultaneously indicated with an outline polygon of a bold line. An area referred as (5) in the figure is formed when the barrier is not shifted in the H1 area, is shifted in the H2 area, and left and right images are not switched for both of the areas.

An area referred as (6) in the figure is formed when the barrier is shifted in the H1 area, is not shifted in the H2 area, and left and right images are switched for both areas. In the (6) area, an area capable of perceiving a right eye image passing through R1' from the H1 area and an area capable of perceiving a right eye image passing through L1 from the H2 area are overlapped.

An area referred as (7) in the figure is formed when the barrier is not shifted in the H1 area, is shifted in the H2 area, and left and right images are switched for both of the areas. In the (7) area, an area capable of perceiving a right eye image passing through L1 from the H1 area and an area capable of perceiving a right eye image passing through L1' from the H2 area are overlapped.

An area referred as (8) in the figure is formed when the barrier is shifted in the H1 area, is not shifted in the H2 area, and left and right images are switched only for the H1 area. In the (8) area, an area capable of perceiving a right eye image passing through L1' from the H1 area and an area capable of perceiving a right eye image passing through R2 from the H2 area are overlapped.

The above four types of combination (5)–(8) includes factors such that the liquid crystal display panel is divided into two areas (H1, H2), whether left and right images are switched or not and whether the barrier is shifted or not in each of the areas when the head position of the viewer 2 is out of the optimum viewing position backward. Combinations of whether left and right images are replaced or not in each of the areas (H1, H2) in an area of (1) to (13) and whether the barrier is shifted or not in each of the areas (H1, H2) are shown in Table 1 below. A right eye image is securely supplied to the right eye of the viewer 2 and a left eye image is mostly introduced in a left eye by the control shown in Table 1.

TABLE 1

For supplying a right eye image when the head of the viewer is in a position backward out of the optimum position.

| Area | H1 | | H2 | |
| --- | --- | --- | --- | --- |
|  | Barrier | Image | Barrier | Image |
| 1 | — | — | ○ | — |
| 2 | ○ | — | — | ⊚ |
| 3 | — | ⊚ | ○ | ⊚ |
| 4 | ○ | ⊚ | — | — |
| 5 | — | — | ○ | — |
| 6 | ○ | — | — | ⊚ |
| 7 | — | ⊚ | ○ | ⊚ |
| 8 | ○ | ⊚ | — | — |

TABLE 1-continued

For supplying a right eye image when the head of the viewer is in a position backward out of the optimum position.

| Area | H1 | | H2 | |
| --- | --- | --- | --- | --- |
|  | Barrier | Image | Barrier | Image |
| 9 | — | — | ○ | — |
| 10 | ○ | — | — | ⊚ |
| 11 | — | ⊚ | ○ | ⊚ |
| 12 | ○ | ⊚ | — | — |
| 13 | — | — | ○ | — |

From an initial position, ○; shifting, ⊚; replacing left and right eye images, —; no change As the viewer is apart from the optimum viewing position backward, a distance between an area capable of perceiving a right eye image and an area capable of perceiving a left eye image is greater. However, the distance is almost the same as the distance between pupils of the viewer and a stereoscopic image is perceivable in considerably broad areas. When the distance is out of the distance between pupils of the viewer, control may be conducted by corresponding to a dominant eye. That is, when a dominant eye of the viewer 2 is right, the above control may be conducted depending on which area (1)–(13) the right eye is so that a right eye image is securely supplied to the right eye of the viewer 2 and a left eye image is supplied to the left eye of the viewer 2.

[Dividing a Liquid Crystal Display Panel into Two Areas]
(A Head Position of the Viewer 2 is out of an Optimum Viewing Position Forward)

Figure 17:
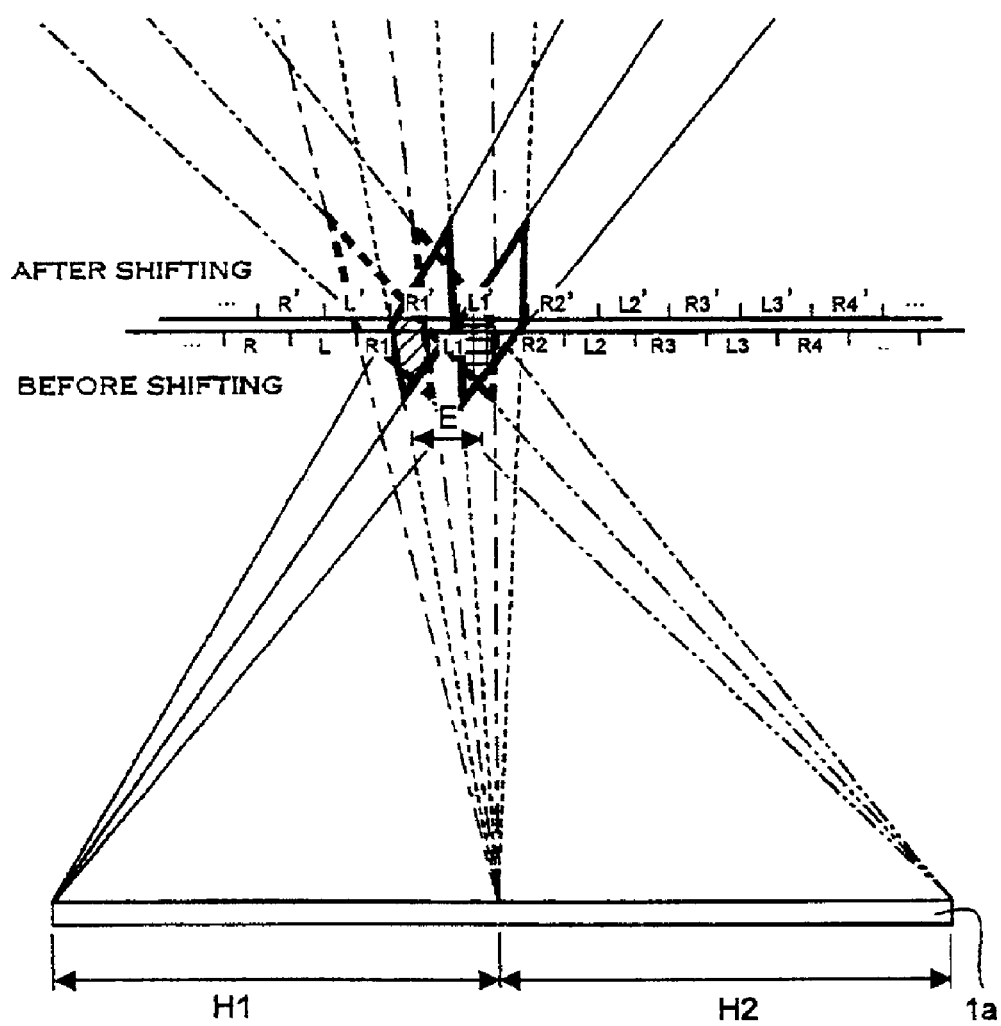
FIG. 17 is an explanatory view illustrating an area capable of perceiving perfect right eye and left eye images from a whole display surface when the display surface with the shading means is divided into two areas and an optimum control corresponding to the viewer shifting forward from the optimum viewing position is conducted.

FIG. 17 illustrates that the barrier is shifted in the H1 area of the display 1a with the shading means, the barrier is not shifted in the H2 area, and the left and right images are not switched in both of the areas. In this case, a right eye image passing through R1' from the H1 area is perceived in a square indicated with a bold line on a left side of the figure, and a right eye image passing through R1 from the H2 area is perceived in a square indicated with a broken bold line on a left side of the figure. Therefore, a right eye image is perceivable simultaneously from both the H1 and H2 areas in a shaded area indicated in the figure. A left eye image passing through L1' from the H1 area is perceived in a square indicated with a bold line on the right side of the figure, and a left eye image passing through L1 from the H2 area is perceived in a square indicated with a broken bold line on a right side of the figure. Therefore, a left eye image is perceivable simultaneously from both the H1 and H2 areas in a checked area indicated in the figure.

Figure 18:
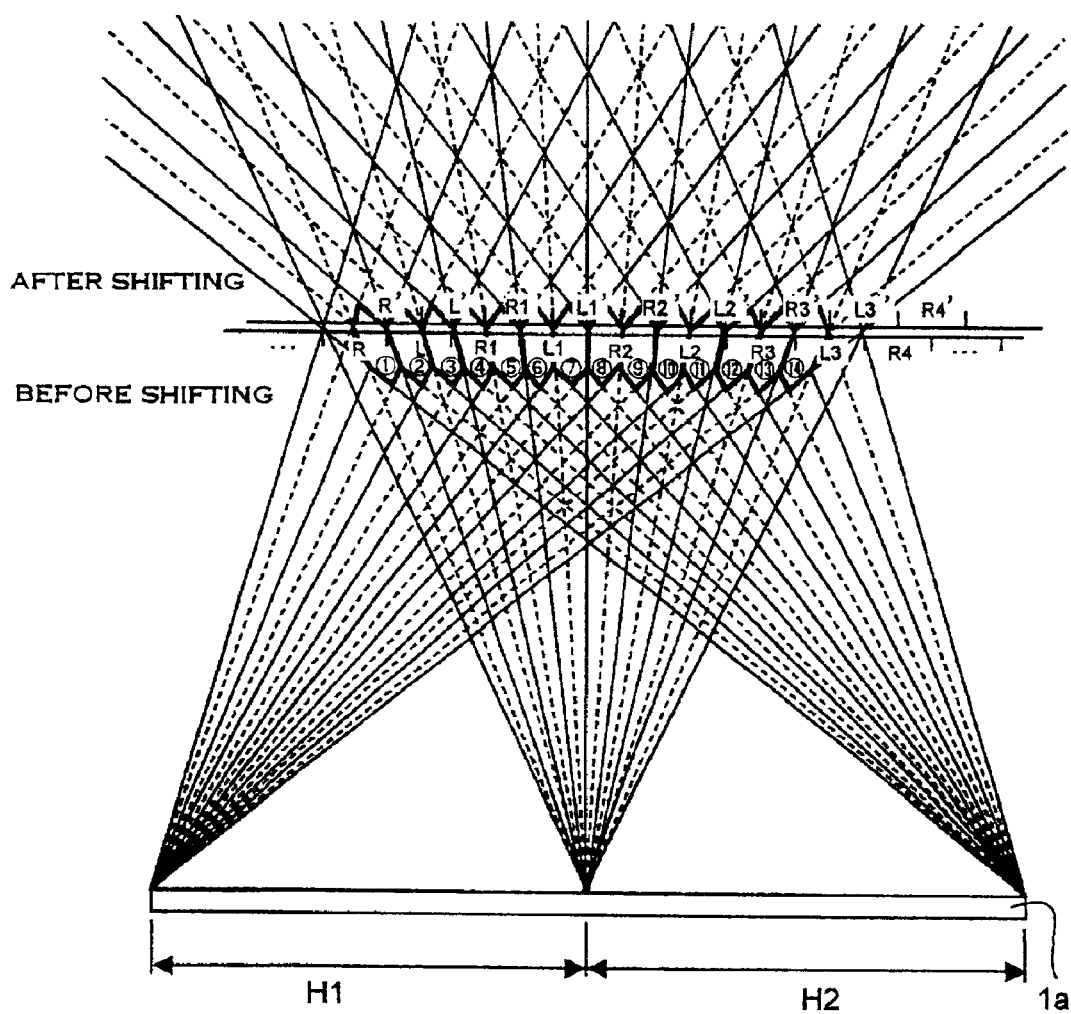
FIG. 18 is an explanatory view illustrating an outline polygon of a bold line indicating an area capable of perceiving a right eye image simultaneously from the two areas of FIG. 17.

FIG. 18 illustrates an area capable of perceiving a right eye image from the H1 and H2 areas simultaneously indicated with an outline polygon of a bold line. An area referred as (5) in the figure is formed when the barrier is shifted in the H1 area, is not shifted in the H2 area, and left and right images are not replaced in both of the areas.

An area referred as (6) in the figure is formed when the barrier is not shifted in the H1 area, is shifted in the H2 area, and left and right images are replaced only for the H1 areas. In the (6) area, an area capable of perceiving a right eye image passing through L1 from the H1 area and an area capable of perceiving a right eye image passing through R1' from the H2 area are overlapped.

An area referred as (7) in the figure is formed when the barrier is shifted in H1 area, is not shifted in the H2 area, and left and right images are switched for both areas. In the (7) area, an area capable of perceiving a right eye image passing through L1' from H1 area and an area capable of perceiving a right eye image passing through L1 from H2 are overlapped.

An area referred as (8) in the figure is formed when the barrier is not shifted in the H1 area, is shifted in the H2 area, and left and right images are switched only for the H2 area. In the (8) area, an area capable of perceiving a right eye image passing through R2 from the H1 area and an area capable of perceiving a right eye image passing through L1' from the H2 area are overlapped.

The above four types of combination (5)–(8) of that the liquid crystal display panel is divided into two areas (H1, H2), whether left and right images are switched or not and whether the barrier is shifted or not in each of the areas when the head position of the viewer 2 is out of the optimum viewing position forward are listed. Combinations of whether left and right images are switched or not in each of the areas (H1, H2) in an area of (1) to (13) and whether the barrier is shifted or not in each of the areas (H1, H2) are shown in Table 2 below. A right eye image is securely supplied to the right eye of the viewer 2 and a left eye image is mostly introduced in a left eye by control shown in Table 2.

TABLE 2

For supplying a right eye image when the head of the viewer is in a position forward out of the optimum position.

| Area | H1 Barrier | H1 Image | H2 Barrier | H2 Image |
|------|------------|----------|------------|----------|
| 1    | ○          | —        | —          | —        |
| 2    | —          | ⊚        | ○          | —        |
| 3    | ○          | ⊚        | —          | ⊚        |
| 4    | —          | —        | ○          | ⊚        |
| 5    | ○          | —        | —          | —        |
| 6    | —          | ⊚        | ○          | —        |
| 7    | ○          | ⊚        | —          | ⊚        |
| 8    | —          | —        | ○          | ⊚        |
| 9    | ○          | —        | —          | —        |
| 10   | —          | ⊚        | ○          | —        |
| 11   | ○          | ⊚        | —          | ⊚        |
| 12   | —          | —        | ○          | ⊚        |
| 13   | ○          | —        | —          | —        |

From an initial position, ○; shifting, ⊚; replacing left and right eye images, —; no change As the viewer is apart from the optimum viewing position forward, a distance between an area capable of perceiving a right eye image and an area capable of perceiving a left eye image is greater. However, the distance is almost the same as the distance between pupils of the viewer and a stereoscopic image is perceivable in considerably broad areas. When the distance between the two areas is out of the distance between pupils of the viewer, control may be conducted by corresponding to a dominant eye. That is, when a dominant eye of the viewer 2 is right, the above control may be conducted depending on in which area (1)–(13) the right eye is so that a right eye image is securely supplied to the right eye of the viewer 2 and a left eye image is mostly supplied to the left eye of the viewer 2.

Figure 19:
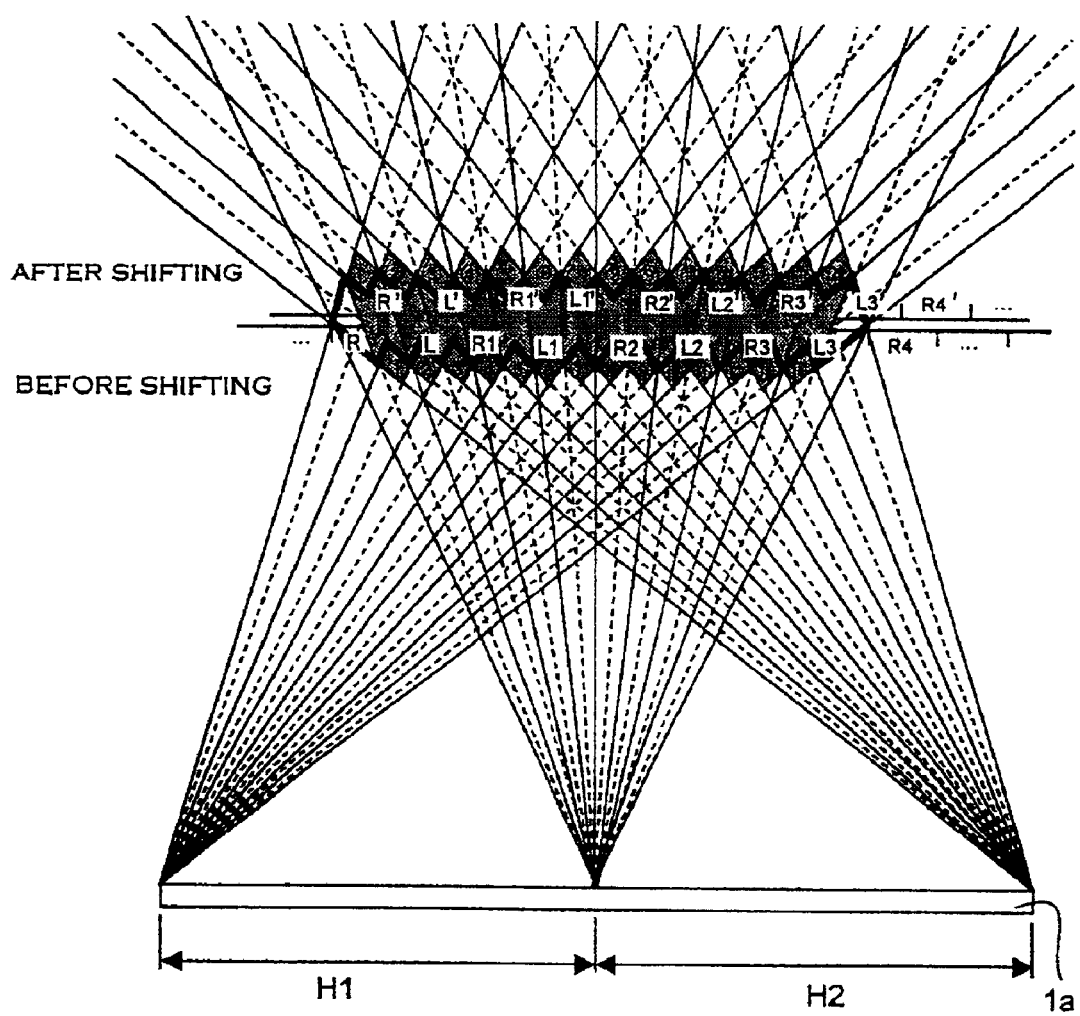
FIG. 19 is an explanatory view illustrating a gray area combining an area capable of perceiving a right eye image of FIG. 16 and an area capable of perceiving a right eye image of FIG. 18.
Figure 20:
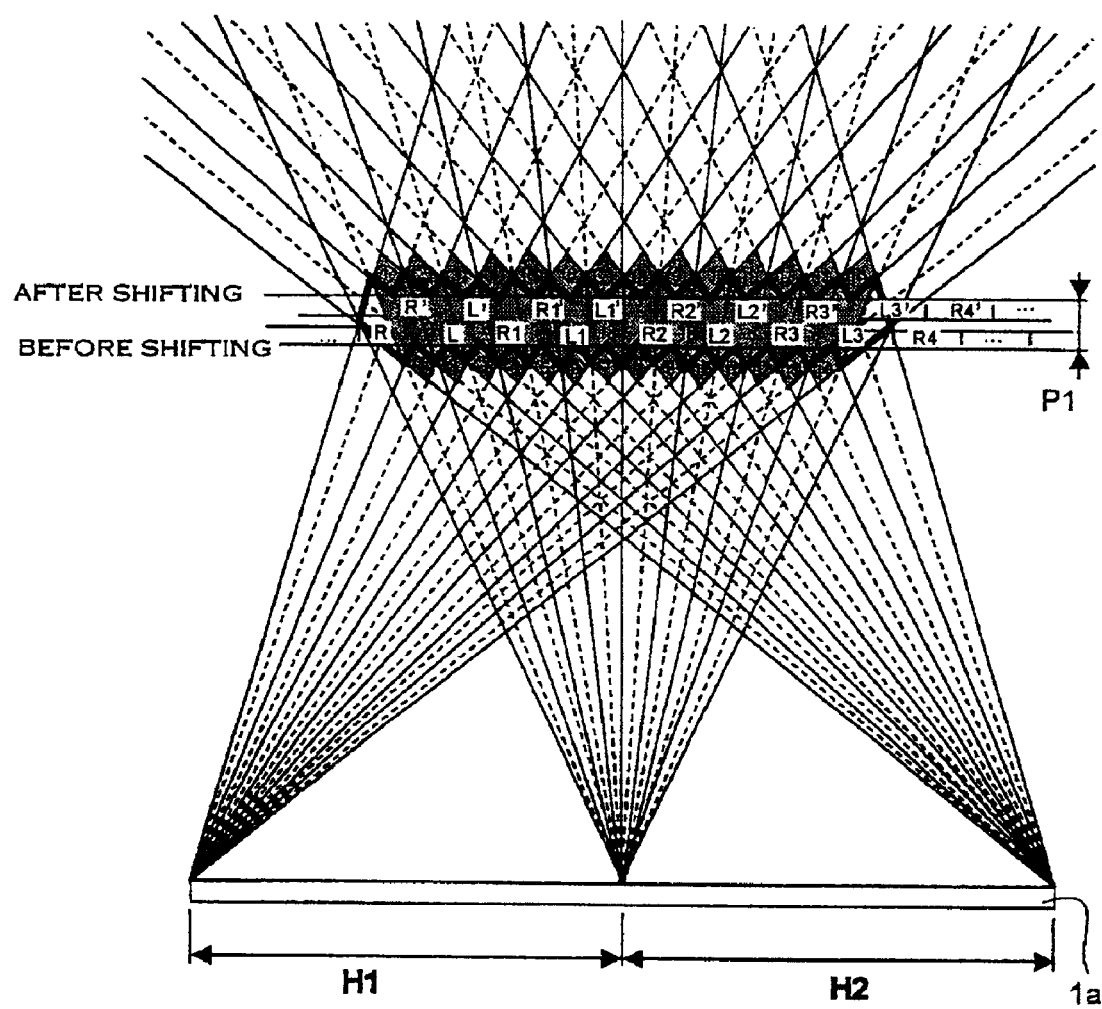
FIG. 20 is an explanatory view illustrating P1 for example as an area for conducting normal control (the display surface is not divided) in FIG. 19.

In FIG. 19, an area capable of perceiving a right eye image from both of the H1 and H2 areas simultaneously in FIG. 16 and an area capable of perceiving a right eye image from both of the H1 and H2 areas in FIG. 18 are indicated as a gray area. In FIG. 19, an area indicated with a bold line is an area capable of supplying a normal image (the panel is not divided). When the viewer 2 is in an area capable of supplying image in the bold line area, a normal control (an area is not divided) is conducted, and when the viewer 2 is out of the area, a control for dividing the panel is conducted. When the viewer 2 is in P1 area shown in FIG. 20, a normal control (an area is not divided) is conducted and the viewer 2 is out of P1 area, the above control for dividing the panel may be conducted.

[Dividing a Liquid Crystal Display Panel into Three Areas]
(A Head Position of the Viewer 2 is out of an Optimum Viewing Position Backward)

Figure 21:
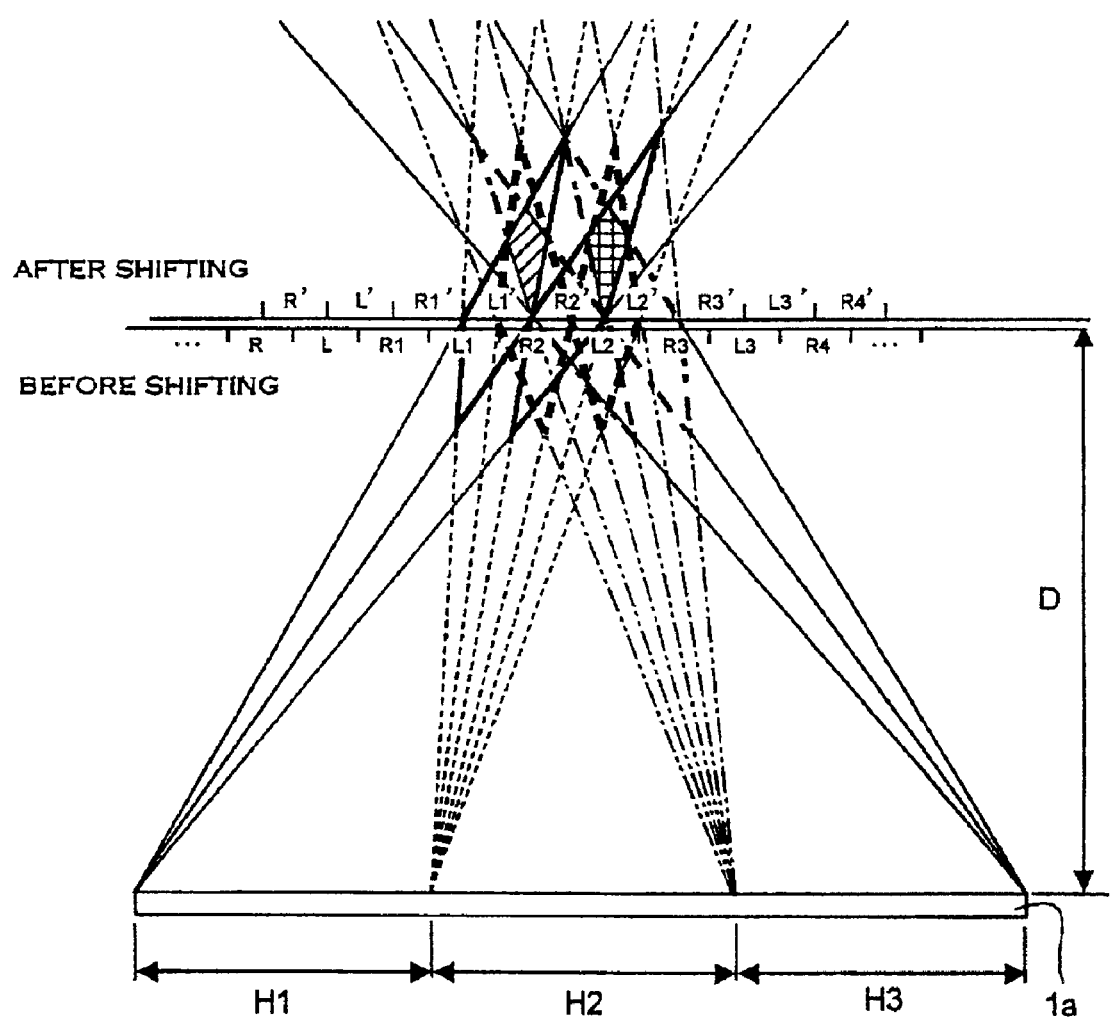
FIG. 21 is an explanatory view illustrating an area capable of perceiving perfect right eye and left eye images from a whole display surface when the display surface with the shading means is divided into three areas and an optimum control corresponding to the viewer shifting backward from the optimum viewing position is conducted.

FIG. 21 illustrates that the barrier is not shifted in the H2 area of the display 1a with the shading means, the barrier is shifted in the H1 and H3 areas, and the left and right images are switched only for the H1 area. In this case, a right eye image passing through L1' from the H1 area is perceived in a square indicated with a bold line on the left side of the figure, and a right eye image passing through R2 from H2 area is perceived in a square indicated with a broken bold line on a left side of the figure, and a right eye image passing through R2' from H3 area is perceived in a square indicated with a dotted bold line. Therefore, a right eye image is perceivable simultaneously from the H1, H2, and H3 areas in a shaded area indicated in the figure. A left eye image passing through R2' from the H1 area is perceived in a square indicated with a bold line on the right side of the figure, and a left eye image passing through L2 from H2 area is perceived in a square indicated with a broken bold line on a right side of the figure, and a left eye image passing through L2' from the H3 area is perceived in a square indicated with a dotted bold line. Therefore, a left eye image is perceivable simultaneously from the H1, H2, and H3 areas in a shaded area indicated in the figure.

Figure 22:
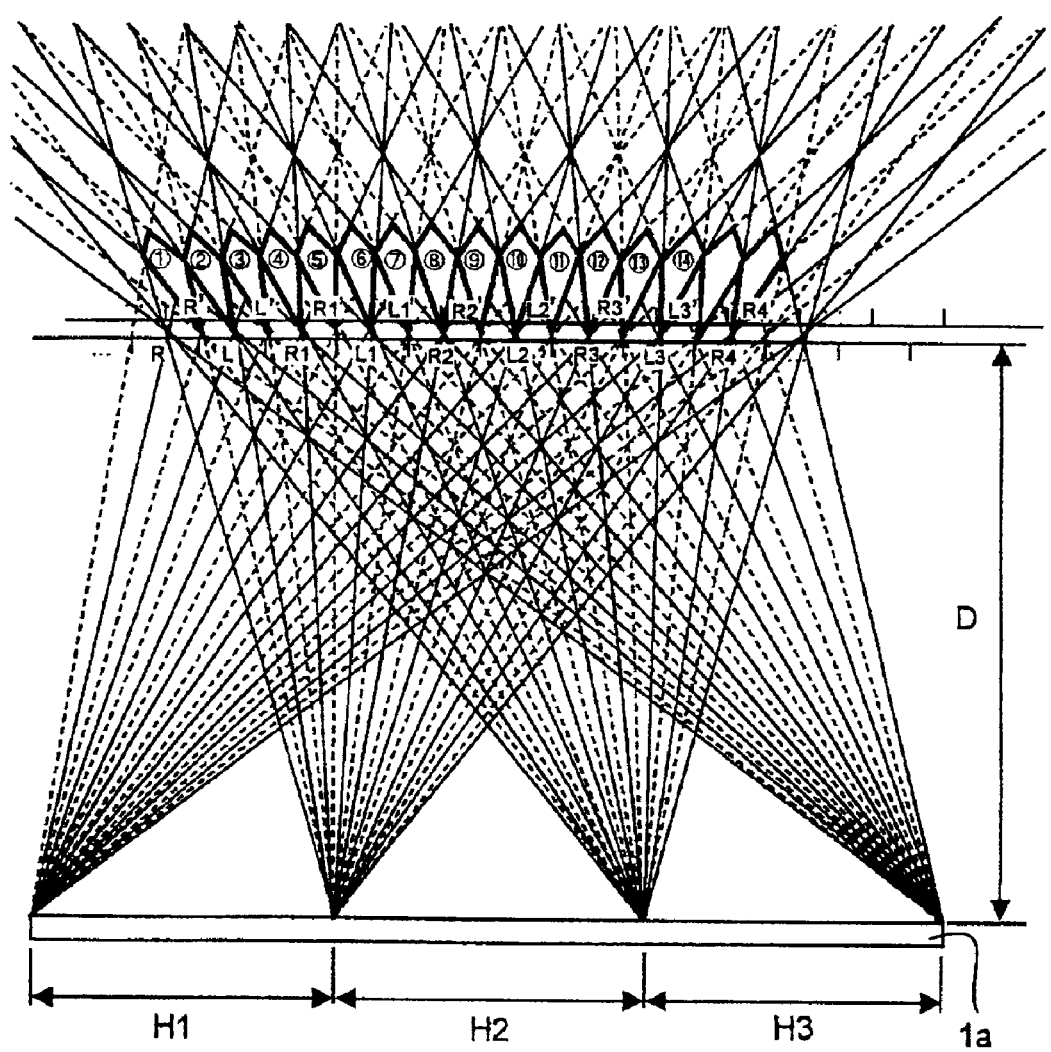
FIG. 22 is an explanatory view illustrating an outline polygon of a bold line indicating an area capable of perceiving a right eye image simultaneously from the three areas of FIG. 21.

FIG. 22 illustrates an area capable of perceiving a right eye image from the H1, H2, and H3 areas simultaneously is indicated with a polygon of a bold line. An area referred as (8) in the figure is formed when the barrier is shifted in the H1 and H3 areas, is not shifted in the H2 area, and left and right images are replaced only in the H1 area.

Four types of combination (for example (8)–(11)) of that the liquid crystal display panel is divided into three areas (H1, H2, H3), whether left and right images are switched or not and whether the barrier is shifted or not in each of the areas when the head position of the viewer 2 is out of the optimum viewing position backward are listed. Combinations of whether left and right images are switched or not in each of the areas (H1, H2, H3) in an area of (1) to (13) and whether the barrier is shifted or not in each of the areas (H1, H2, H3) are shown in Table 3 below. A right eye image is securely supplied to the right eye of the viewer 2 and a left eye image is introduced in a left eye mostly by control shown in Table 3.

TABLE 3

For supplying a right eye image when the head of the viewer is in a position backward out of the optimum position.

| Area | H1 Barrier | H1 Image | H2 Barrier | H2 Image | H3 Barrier | H3 Image |
|------|------------|----------|------------|----------|------------|----------|
| 1    | —          | —        | ○          | ⊚        | —          | ⊚        |
| 2    | ○          | —        | —          | ⊚        | ○          | ⊚        |
| 3    | —          | ⊚        | ○          | ⊚        | —          | —        |
| 4    | ○          | ⊚        | —          | —        | ○          | —        |
| 5    | —          | —        | ○          | —        | —          | ⊚        |
| 6    | ○          | —        | —          | ⊚        | ○          | ⊚        |
| 7    | —          | ⊚        | ○          | ⊚        | —          | —        |
| 8    | ○          | ⊚        | —          | —        | ○          | —        |
| 9    | —          | —        | ○          | —        | —          | ⊚        |
| 10   | ○          | —        | —          | ⊚        | ○          | ⊚        |
| 11   | —          | ⊚        | ○          | ⊚        | —          | —        |
| 12   | ○          | ⊚        | —          | —        | ○          | —        |
| 13   | —          | —        | ○          | —        | —          | ⊚        |

From an initial position, ○; shifting, ⊚; replacing left and right eye images, —; no change As the viewer is apart from the optimum viewing position backward, a distance between an area capable of perceiving a right eye image and an area capable of perceiving a left eye image is greater. However, the distance is almost the same as the distance between pupils of the viewer and a stereoscopic image is perceivable in considerable broad areas. When the distance is greater than the distance between pupils of the viewer, control may be conducted by corresponding to a dominant eye. That is, when a dominant eye of the viewer 2 is right, the above control may be conducted depending on which area (1)–(13) the right eye is in in FIG. 20 so that a right eye image is securely supplied to the right eye of the viewer 2 and a left eye image is supplied to the left eye of the viewer 2.

[Dividing a Liquid Crystal Display Panel into Three Areas]
(A Head Position of the Viewer 2 is out of an Optimum Viewing Position Forward)

Figure 23:
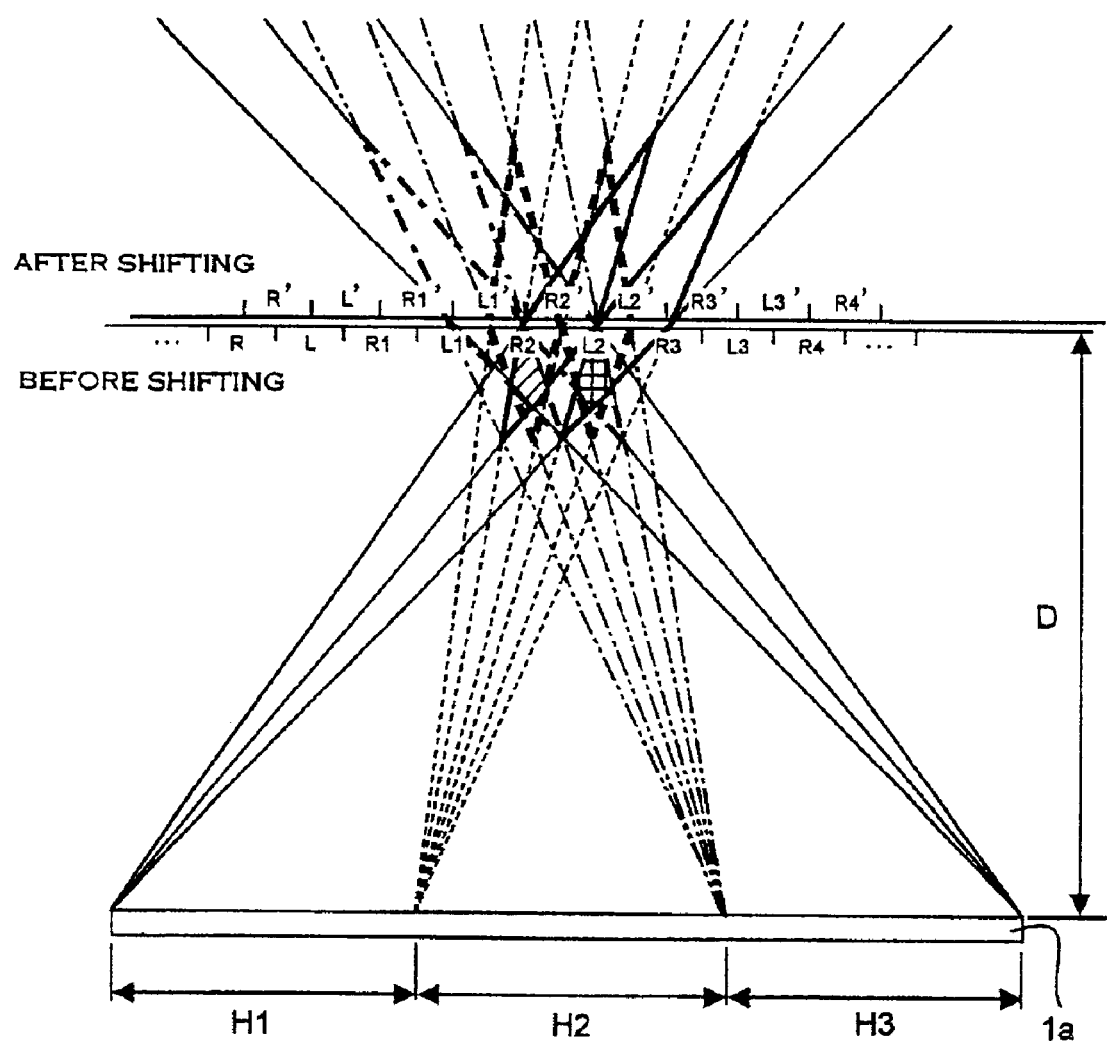
FIG. 23 is an explanatory view illustrating an area capable of perceiving perfect right eye and left eye images from a whole display surface when the display surface with the shading means is divided into three areas and an optimum control corresponding to the viewer shifting forward from the optimum viewing position is conducted.

FIG. 23 illustrates that the barrier is not shifted in the H2 area of the display 1a with the shading means, the barrier is shifted in the H1 and H3 areas, and the left and right images are switched only in the H3 area. In this case, a right eye image passing through R2' from the H1 area is perceived in a square indicated with a bold line on a left side of the figure, and a right eye image passing through R2 from H2 area is perceived in a square indicated with a broken bold line on a left side of the figure, and a right eye image passing through L1' from H3 area is perceived in a square indicated with a dotted bold line. Therefore, a right eye image is perceivable simultaneously from the H1, H2, and H3 areas in a shaded area indicated in the figure. A left eye image passing through L2' from the H1 area is perceived in a square indicated with a bold line on a right side of the figure, and a left eye image passing through L2 from the H2 area is perceived in a square indicated with a broken bold line on a right side of the figure, and a left eye image passing through R2' from H3 area is perceived in a square indicated with a dotted bold line. Therefore, a left eye image is perceivable simultaneously from the H1, H2, and H3 areas in a shaded area indicated in the figure.

Figure 24:
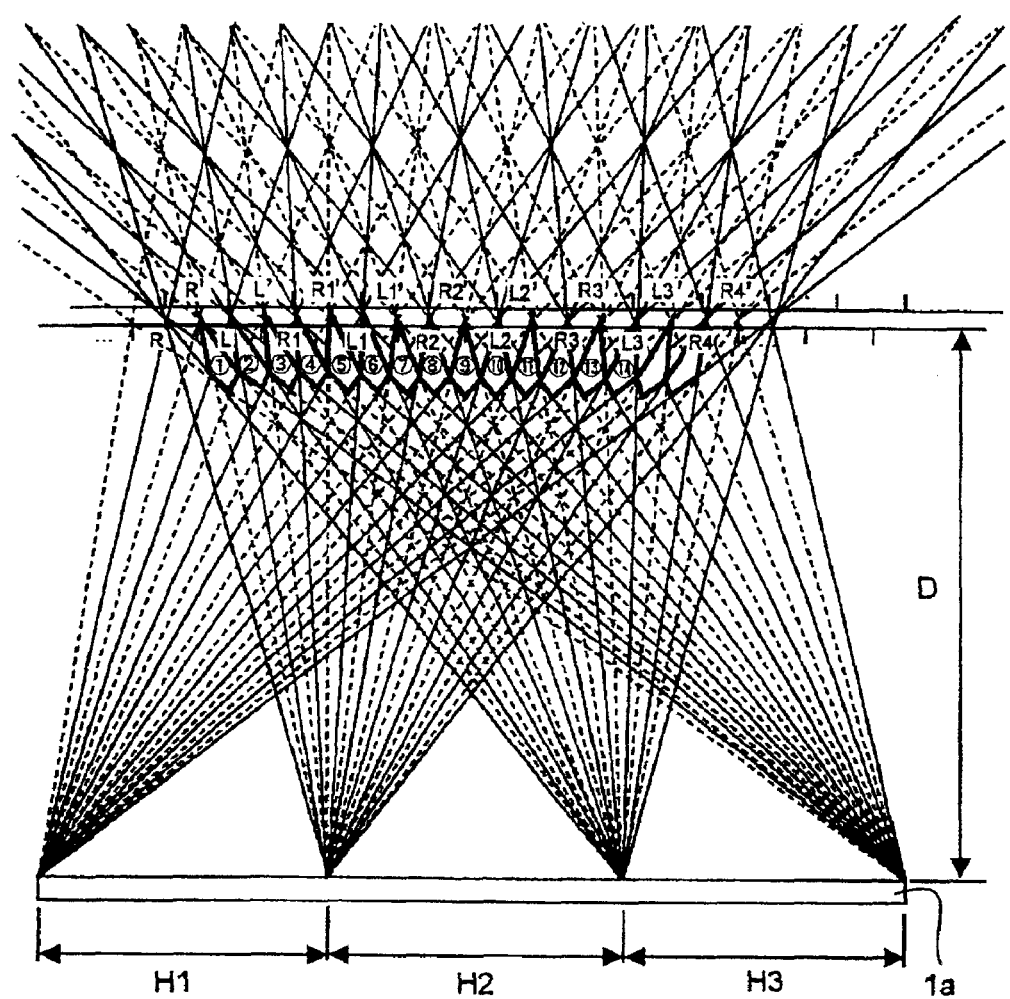
FIG. 24 is an explanatory view illustrating an outline polygon of a bold line indicating an area capable of perceiving a right eye image simultaneously from the three areas of FIG. 23.

FIG. 24 illustrates an area capable of perceiving a right eye image from the H1, H2, and H3 areas simultaneously indicated with a polygon of a bold line. An area referred as (8) in the figure is formed when the barrier is shifted in the H1 and H3 areas, is not shifted in the H2 area, and left and right images are switched only in the H3 area.

Four types of combinations (for example (8)–(11)) of that the liquid crystal display panel is divided into three areas (H1, H2, H3), whether left and right images are switched or not and whether the barrier is shifted or not in each of the areas when the head position of the viewer 2 is out of the optimum viewing position backward are listed. Combinations of whether left and right images are replaced or not in each of the areas (H1, H2, H3) in an area of (1) to (13) and whether the barrier is shifted or not in each of the areas (H1, H2, H3) are shown in Table 4 below. A right eye image is securely supplied to the right eye of the viewer 2 and a left eye image is introduced in a left eye mostly by control shown in Table 4.

TABLE 4

For supplying a right eye image when the head of the viewer is in a position forward out of the optimum position.

| | H1 | | H2 | | H3 | |
|---|---|---|---|---|---|---|
| Area | Barrier | Image | Barrier | Image | Barrier | Image |
| 1 | — | ◎ | ○ | — | — | — |
| 2 | ○ | ◎ | — | ◎ | ○ | — |
| 3 | — | — | ○ | ◎ | — | ◎ |
| 4 | ○ | — | — | — | ○ | ◎ |

TABLE 4-continued

For supplying a right eye image when the head of the viewer is in a position forward out of the optimum position.

| | H1 | | H2 | | H3 | |
|---|---|---|---|---|---|---|
| Area | Barrier | Image | Barrier | Image | Barrier | Image |
| 5 | — | ◎ | ○ | — | — | — |
| 6 | ○ | ◎ | — | ◎ | ○ | — |
| 7 | — | — | ○ | ◎ | — | ◎ |
| 8 | ○ | — | — | — | ○ | ◎ |
| 9 | — | ◎ | ○ | — | — | — |
| 10 | ○ | ◎ | — | ◎ | ○ | — |
| 11 | — | — | ○ | ◎ | — | ◎ |
| 12 | ○ | — | — | — | ○ | ◎ |
| 13 | — | ◎ | ○ | — | — | — |

From an initial position, ○; shifting, ◎; replacing left and right eye images, —; no change As the viewer is apart from the optimum viewing position backward, a distance between an area capable of perceiving a right eye image and an area capable of perceiving a left eye image is greater. However, the distance is almost the same as the distance between pupils of the viewer and a stereoscopic image is perceivable in considerable broad areas. When the distance is greater than the distance between pupils of the viewer, control may be conducted by corresponding to a dominant eye. That is, when a dominant eye of the viewer 2 is right, the above control may be conducted depending on which area (1)–(13) the right eye is in in FIG. 22 so that a right eye image is securely supplied to the right eye of the viewer 2 and a left eye image is supplied to the left eye of the viewer 2.

Figure 25:
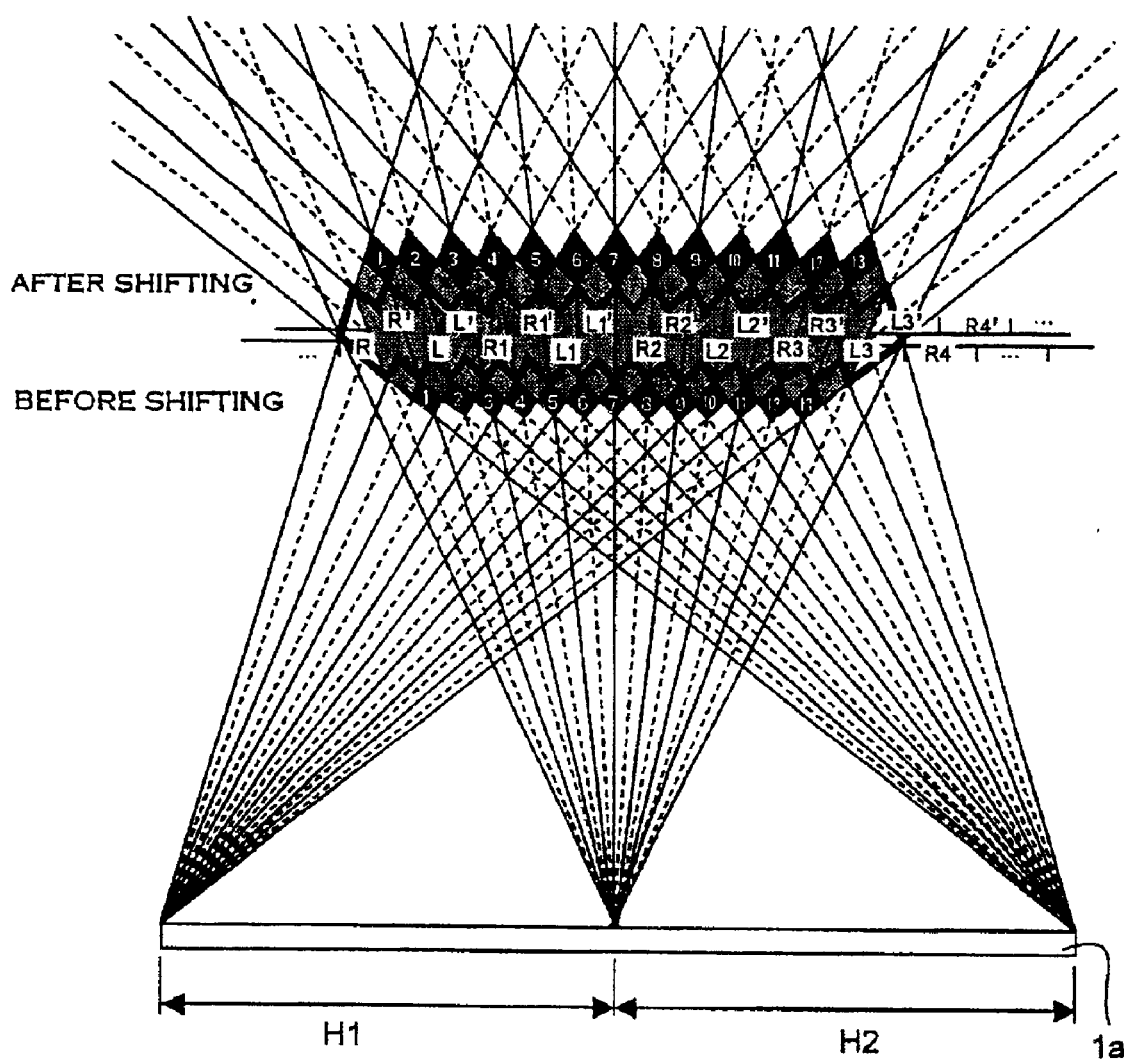
FIG. 25 is an explanatory view illustrating the area shown in FIG. 22 and the area shown in FIG. 24 are added into FIG. 19.

FIG. 25 illustrates that areas shown in FIGS. 22, 24 are added to FIG. 19. Blacked areas with reference numerals in the figure are added to an area capable of supplying a right eye image by the display divided into three areas. Therefore, when the head position of the viewer 2 is shifted in areas with the above reference numerals, replacement of left and right images in the three areas and shifting of the barrier are controlled as shown in Tables 3, 4. When the head position of the viewer 2 is shifted to an inner side from the areas with reference numerals, control for dividing the display surface is switched to divide the display surface into two areas and replacement of left and right images in the two areas and shifting of the barrier are controlled as shown in Tables 1, 2.

[Dividing a Liquid Crystal Display Panel into Four Areas]

Figure 26:
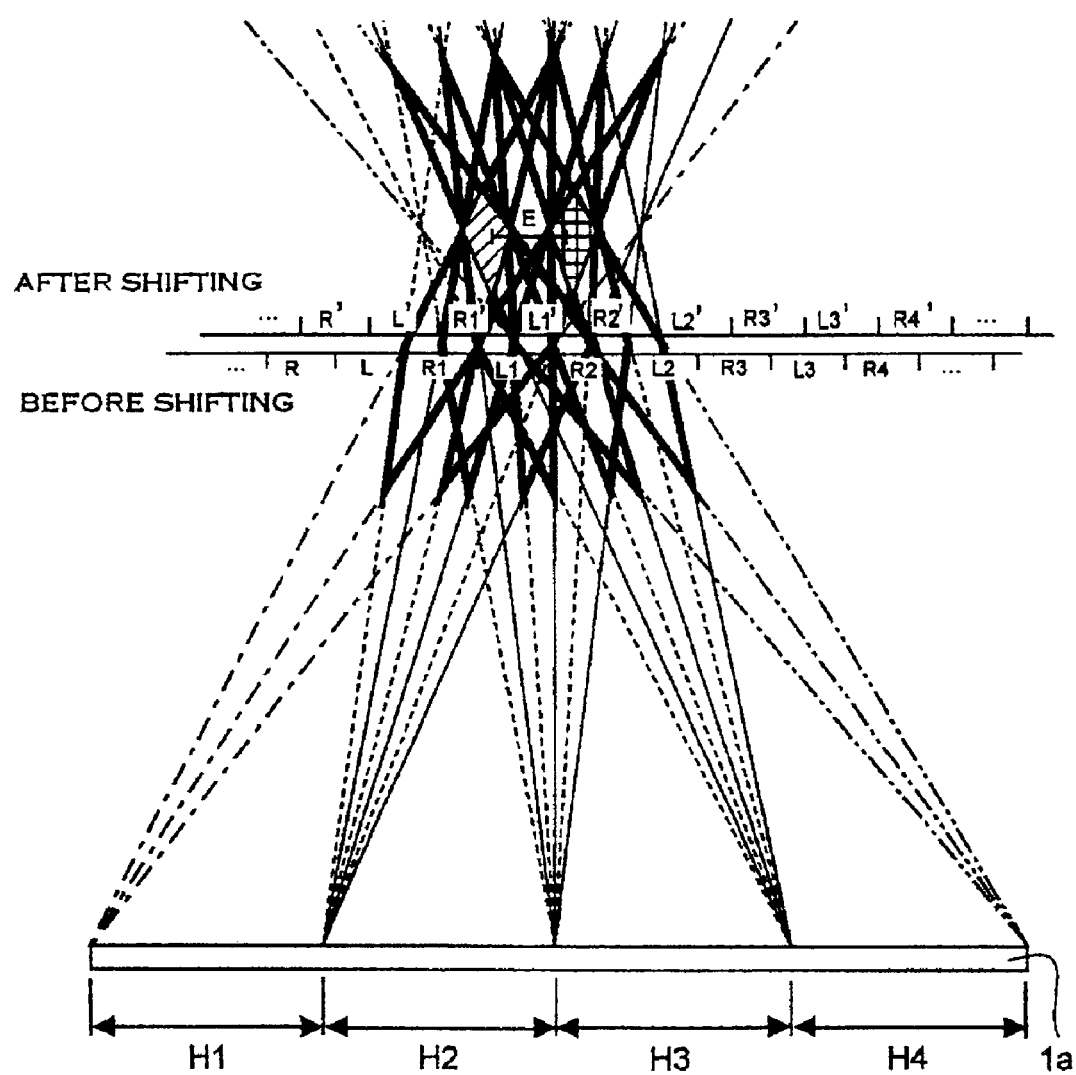
FIG. 26 is an explanatory view illustrating an area capable of perceiving perfect right eye and left eye images from a whole display surface when the display surface with the shading means is divided into four areas and an optimum control corresponding to the viewer shifting backward from the optimum viewing position is conducted.
Figure 27:
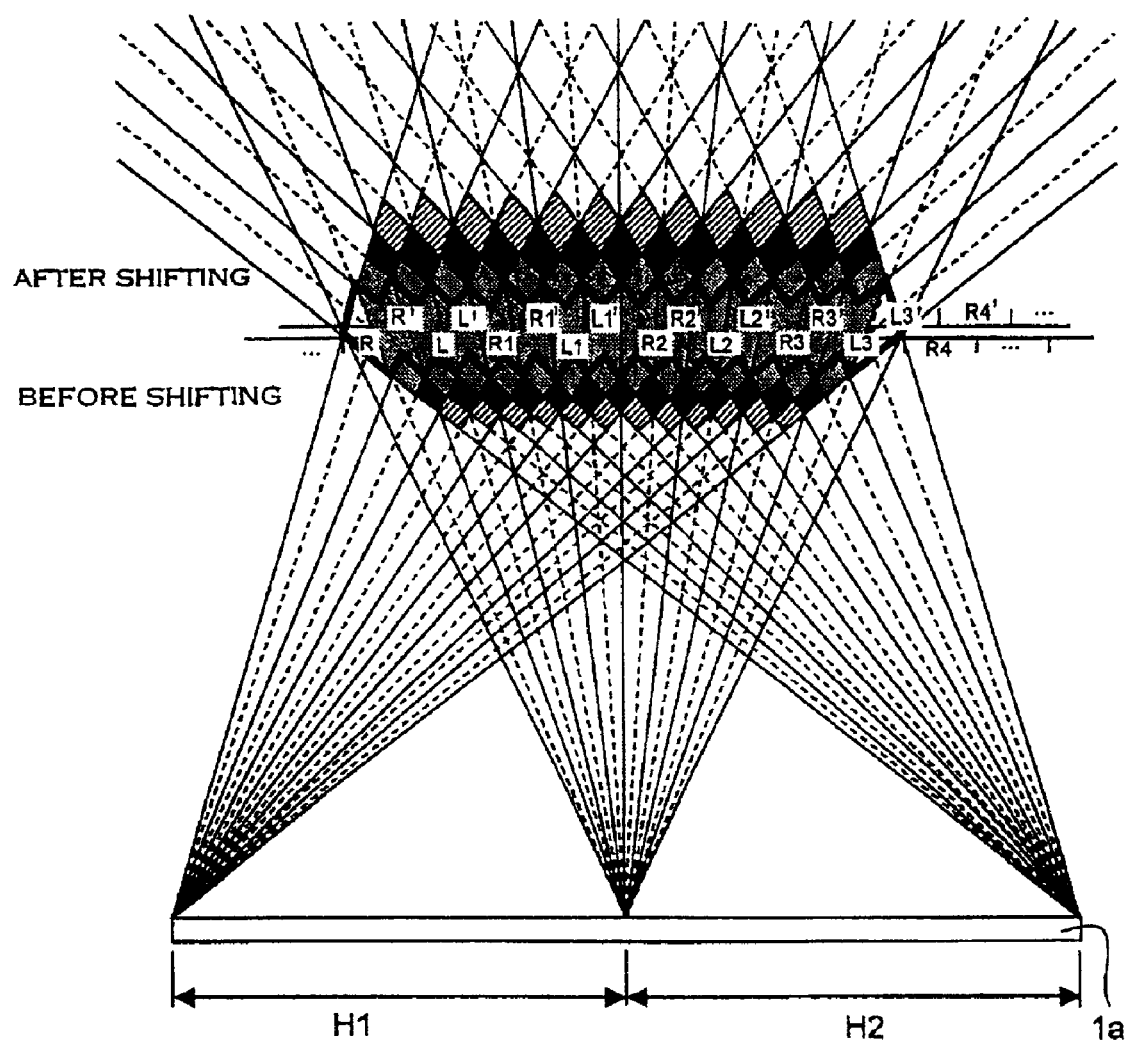
FIG. 27 is an explanatory view illustrating that the display surface is divided into four areas and an area for supplying image is enlarged from the optimum viewing position backward and forward and an area capable of supplying the right eye image in FIG. 25 is added.

FIG. 26 illustrates that the display surface is divided into four areas and an area capable of supplying image is enlarged backward from an optimum viewing position. A check area in the figure is an area capable of supplying a right eye image and a shaded area is an area capable of supplying a left eye image by controlling by the same principle as in cases of the above mentioned control when the display surface is divided into two or three areas, and a stereoscopic image can be perceived when the viewer's right and left eyes are respectively within the areas for supplying an image. In FIG. 27, the display surface is divided into four areas and an area capable of supplying an image is enlarged in back and forth directions from the optimum viewing position and the area capable of supplying a right eye image of FIG. 25 is added. As divided areas increases, a square arranged laterally is enlarged and an area capable of perceiving a stereoscopic image is enlarged in back and forth directions. Although a pitch between square areas is broadened in a back direction and is contracted in a forth direction as the viewer is away from the optimum viewing position, the pitch is almost the same as the distance between pupils and a stereoscopic image is perceivable in a considerable broad area. When the pitch is shifted from the distance between the pupils, control may be conducted by giving priority to a dominant eye of the viewer 2.

The above stereoscopic image display device ensures stereoscopic image display with a broad stereoscopic viewing area in both back and forth directions by dividing a display surface into a plurality of areas. In the mean time, when the shading part of the shading barrier is controlled to shift, a width of the shading part on a boundary of the areas becomes uniform. When the width of the shading part becomes uniform in the boundary part, luminescent lines and black lines may be observed depending on a position of the viewer. This situation is explained hereinafter.

Figure 28:
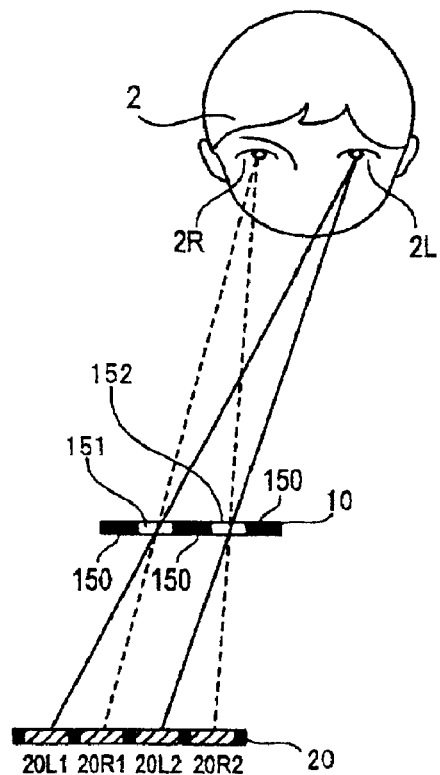
FIG. 28 is a schematic view illustrating that the viewer watches a pixel on the liquid crystal panel through the aperture of the shading barrier from an optimum position.

FIG. 28 is a schematic view illustrating that the viewer 2 observes pixels 20L1, 20L2, and 20R2 on the liquid crystal panel 20 through apertures 151, 152 of the shading barrier 10 from an optimum position. In this case, when a right eye 2R of the viewer 2 watches a center part of the pixel 20L1 through the aperture 151, the viewer 2 also watches the pixel 20L2 through the aperture 152. Therefore, when the viewer 2 shifts in left and right directions, the viewer 2 can not look at the two pixels because the two pixels also shifts and are hidden by the shading part. Thus, if a boundary of the divided areas is in this position, a difference of a timing in replacing left and right images and shifting the shading part 150 is not generated, and it can not be distinguished from a case that a whole shading part 150 shifts simultaneously.

Figure 29:
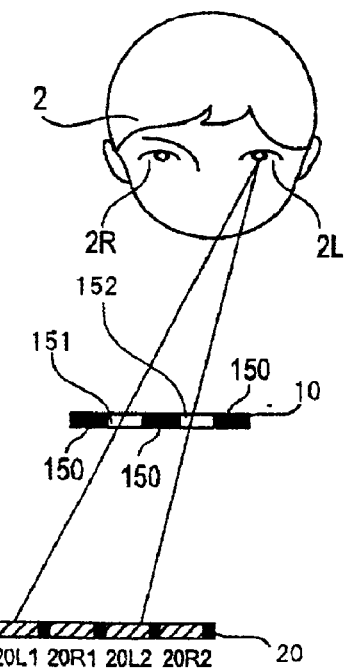
FIG. 29 is a schematic view illustrating that the viewer watches a pixel on the liquid crystal panel through an aperture of the shading barrier in a position closer than the optimum position.

On the other hand, as shown in FIG. 29, for example when the viewer observes a center part of the pixel 20L1 through the aperture 151 from a position closer than the optimum position, the viewer also watches an end of the pixel 20L2 through the aperture 152. When the viewer shifts in left and right directions in this case, timings for hiding the two pixels to the shading part 150 are different and the appearance is different. If a boundary of the divided areas is in this position, differences of shifting of the shading part 150 and timings of replacing left and right images are generated, and it is required to select a fully optimum condition as compared with the case that the whole shading part shifts simultaneously.

Figure 30:
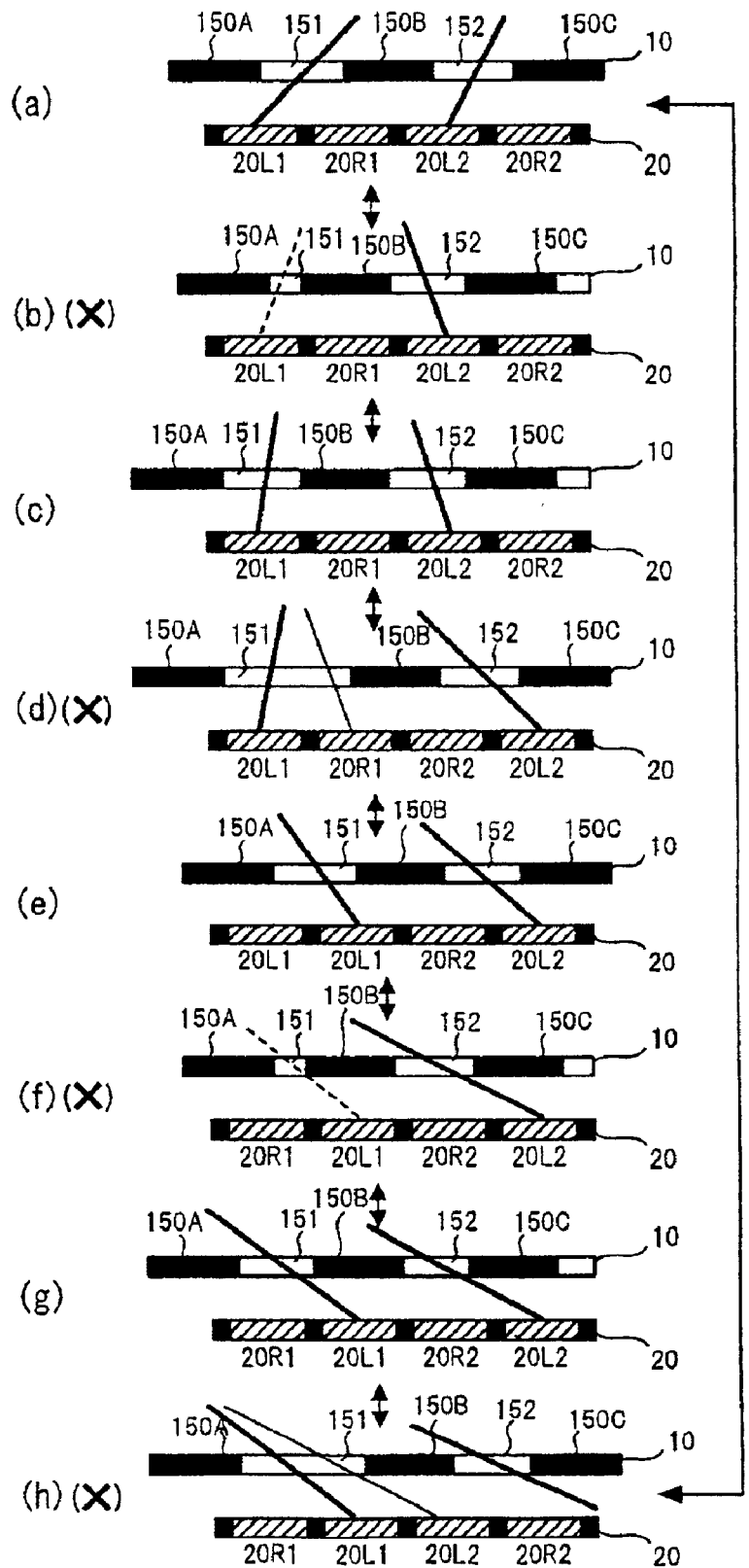
FIG. 30 is a schematic view illustrating a relation between the shading barrier and the pixel on the liquid crystal panel when the viewer shifts to the left in a position closer than the optimum position.
Figure 31:
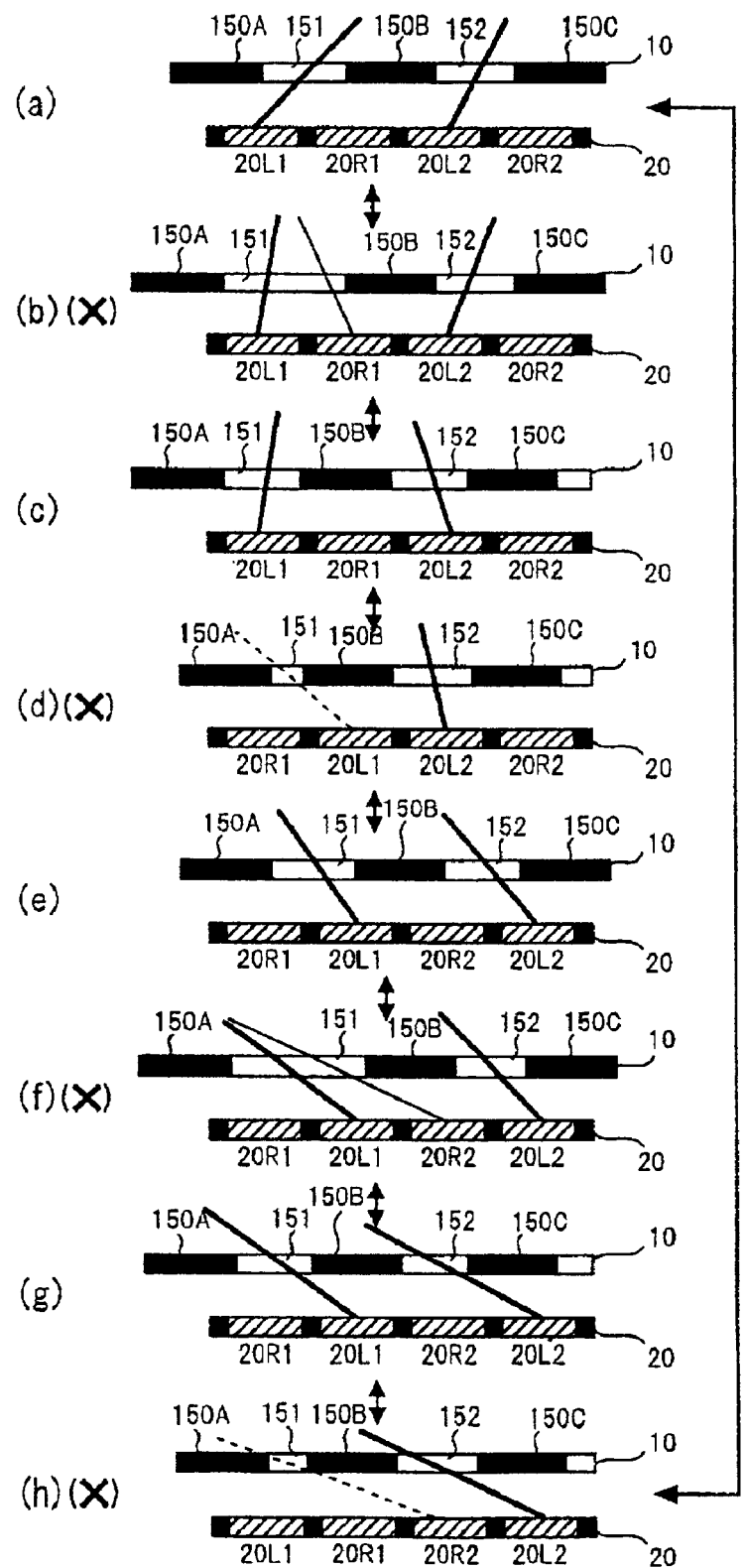
FIG. 31 is a schematic view illustrating a relation between the shading barrier and the pixel on the liquid crystal panel when the viewer shifts to the left in a position farther than the optimum position.

As described above, the timings of shifting of the shading part 150 and replacement of left and right images on right and left sides of the boundary are different with respect to shifting of the viewer. This is illustrated in FIGS. 30, 31. In FIGS. 30, 31, left and right shading parts are separately controlled by letting the aperture 151 a boundary. That is, the shading parts 150B and 150C shift simultaneously, and the shading part 150A shifts separately from the shading parts 150B and 150C. Two lines extended from the pixel indicates a direction of light beams from a pixel for a left eye but does not indicate that a left eye is ahead of the light beam.

FIG. 30 illustrates an example that the viewer shifts to the left in a position closer than the optimum viewing distance, and the shading part on a right side of the boundary 151 shifts first. Explanation for a case when the viewer shifts to the left side orderly is made in accordance with FIGS. 30(a), (b),–(h). When the viewer shifts to the left, the state shifts from FIG. 30(a) to FIG. 30(h), and when the viewer shifts to the left further, the state returns to FIG. 30(a).

In FIG. 30(a), the pixel are normally observed through the aperture 151. Then when the viewer shifts to the left, the shading parts 150B, 150C shift to the left as shown in FIG. 30(b). The aperture 151 is narrow and the viewer has a difficulty in watching the pixel and a black line is perceived from the viewing position. When the viewer shifts to the left further, the shading part 150A shifts and returns to a normal condition as shown in FIG. 30(c).

When the shading parts 150B and 150C return to the original positions as shown in FIG. 30(d), the pixels 20L2, 20R2 are replaced at the same time. In these positions, the aperture 151 becomes broad and a luminescent line is observed from the viewing position. In FIG. 30(e), the pixels 20L1 and 20R1 are replaced and the shading part 150A returns to the original normal position.

In FIG. 30(f), the shading parts 150B, 150C shift again and the aperture 151 becomes narrow, thus the black line is observed. In FIG. 30(g), the shading part 150A shifts to a normal viewing position. In FIG. 30(h), the shading parts 150B, 150C return to the original positions and the pixels 20L2, 20R2 are replaced to return to the original positions. In these positions, the aperture 151 becomes broad and the luminescent line is observed from the viewing position, then, returns to the state shown in FIG. 30(a).

FIG. 31 illustrates an example that the viewer shifts to the left in a position farther than the optimum viewing position. The shading part on a left side of the boundary 151 shifts first. FIGS. 31(a), (b) . . . (h) illustrate when the viewer shifts to the left sequentially. The shifting of the shading parts starts from FIG. 31(a) and shifts orderly to FIG. 31(h), and the viewer shifts to the left further, the shading parts returns to the state of FIG. 31(a). In these cases, as shown in FIG. 30, the width of the aperture 151 changes and the luminescent line and the black line are observed.

Figure 32:
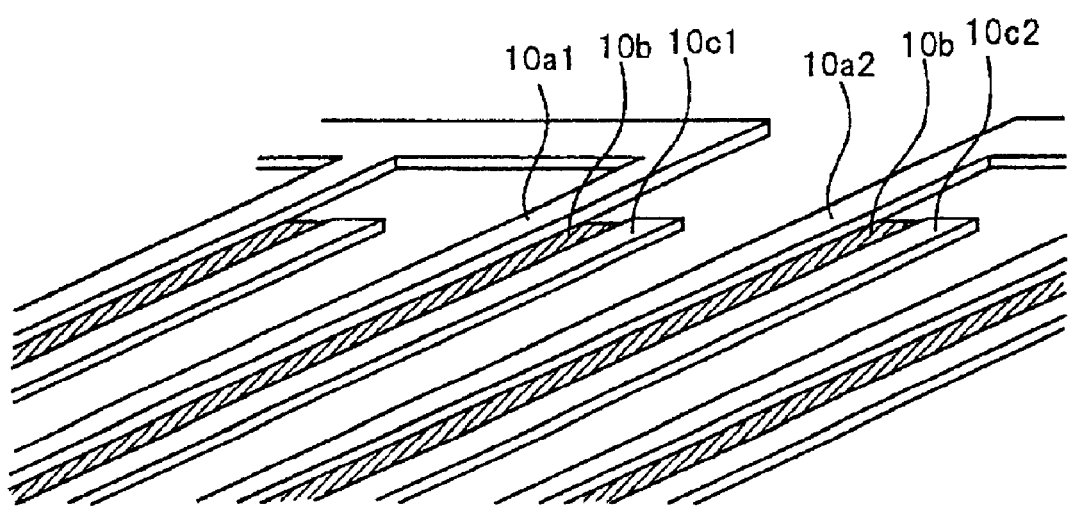
FIG. 32 is a perspective view illustrating a transparent electrode in a structure of a boundary part between the divided areas in the shading barrier 10 shown in FIG. 13.
Figure 33:
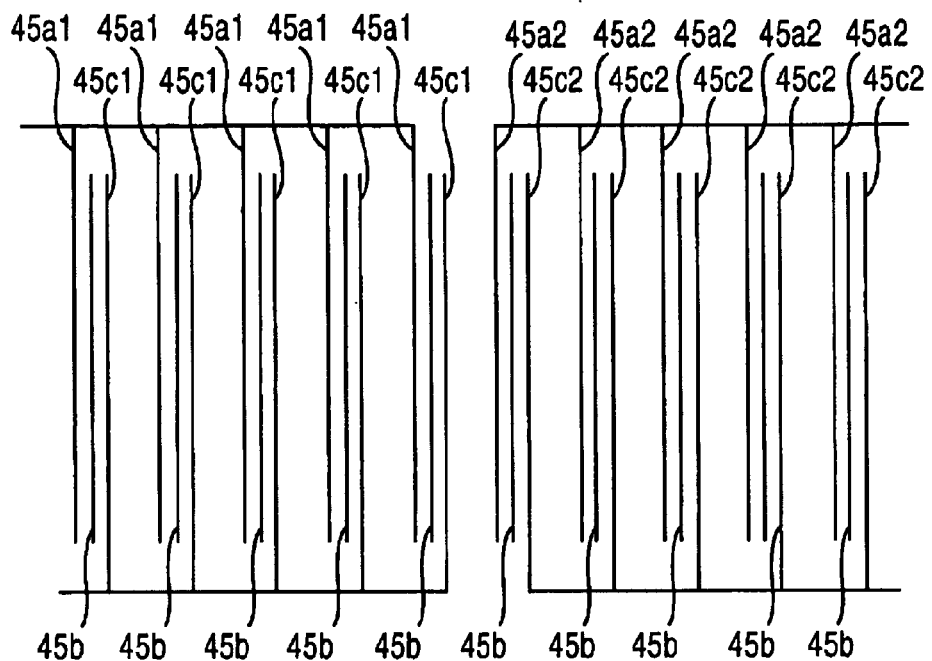
FIG. 33 is a structural view illustrating the transparent electrodes divided into groups shown in FIG. 32.

FIG. 32 is a perspective view illustrating the transparent electrode in a structure of a boundary part between the divided areas of the shading barrier 10 shown in FIG. 13. FIG. 33 is a structure of the transparent electrodes divided into groups. The transparent electrodes 45a1, 45a2, 45b1, and 45b2 are categorized into different groups and each of the groups are collected with lateral electrodes in upper or lower areas. These electrodes are separately controlled by every group.

An alternating voltage of 0V or a square wave is applied to the transparent electrode 45a1, 45a2, 45b1, and 45b2 of the panel, and a voltage of 0V is applied to the transparent electrode 44 constantly. Then liquid crystals on an upper part of the transparent electrodes applied with the alternating voltage are aligned and a polarization axis is not rotated. Therefore, light incident to this part does not pass through the polarizing plate 421 and this part serves as the shading part together with the continuous shading part 46.

Normally the transparent electrodes 45a1 and 45b1 form a pair to operate. When an alternating voltage is applied to the electrode 45a1, a voltage of 0V is applied to the electrode 45b1. When the alternating voltage is applied to the electrode 45b1, a voltage of 0V is applied to the electrode 45a1. The transparent electrodes 45a2 and 45b2 form a pair to operate. When an alternating voltage is applied to the electrode 45a2, a voltage of 0V is applied to the transparent electrode 45b2. When an alternating voltage is applied to the electrode 45b2, a voltage of 0V is applied to the electrode 45a2. A position of the shading part can be changed by changing a transparent electrode to be applied with a voltage.

In the above FIGS. 30 and 31, the electrodes are divided into groups as shown in FIGS. 32, 33. The transparent electrodes 45a1, 45a2, 45b1, and 45b2 are categorized into different groups. Each of the groups is collected with the electrodes in a horizontal direction on an upper or lower part of the areas. These electrodes are separately controlled by every group.

When the electrodes are divided into the groups, a width of the aperture 151 changes and luminescent lines or black lines may be observed. The following embodiment divides the shading barrier into at least two areas and controls so that a width of the aperture on the boundary part of each of the areas of the shading barrier 10 (a parallax barrier) to be controlled separately does not change. Such the control prevents generation of luminescent lines and black lines.

Figure 34:
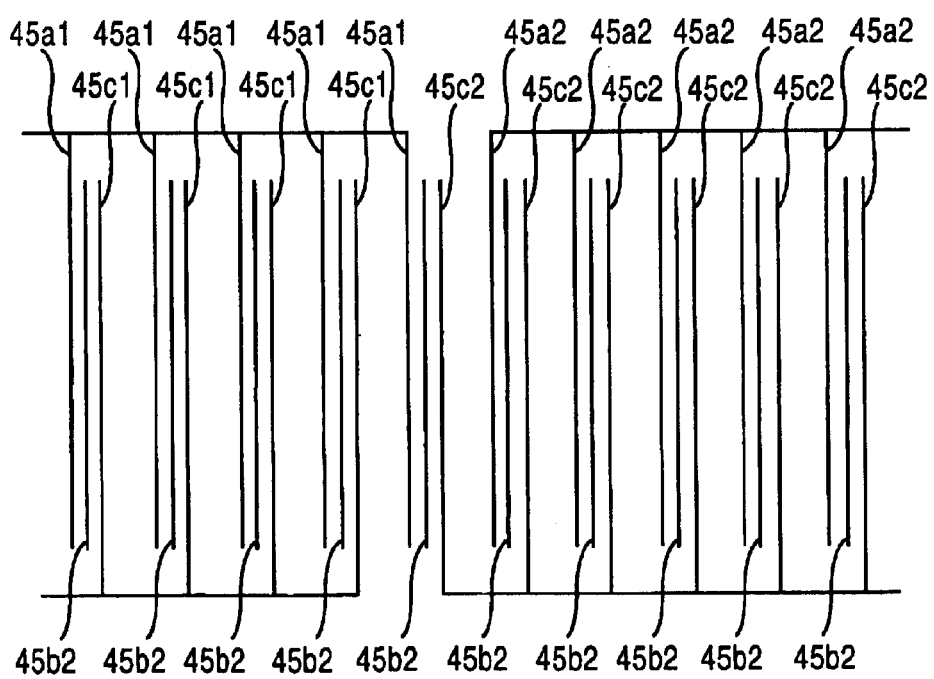
FIG. 34 is a structural view illustrating grouping of the transparent electrodes of the shading barrier in this invention.

As shown in FIG. 34, when forming the transparent electrodes, the transparent electrode for indicating before and after the shifting of the shading part 150 may be formed so as to belong to adjacent separate groups so that a width of the aperture on the boundary part of each of the areas does not change.

Figure 35:
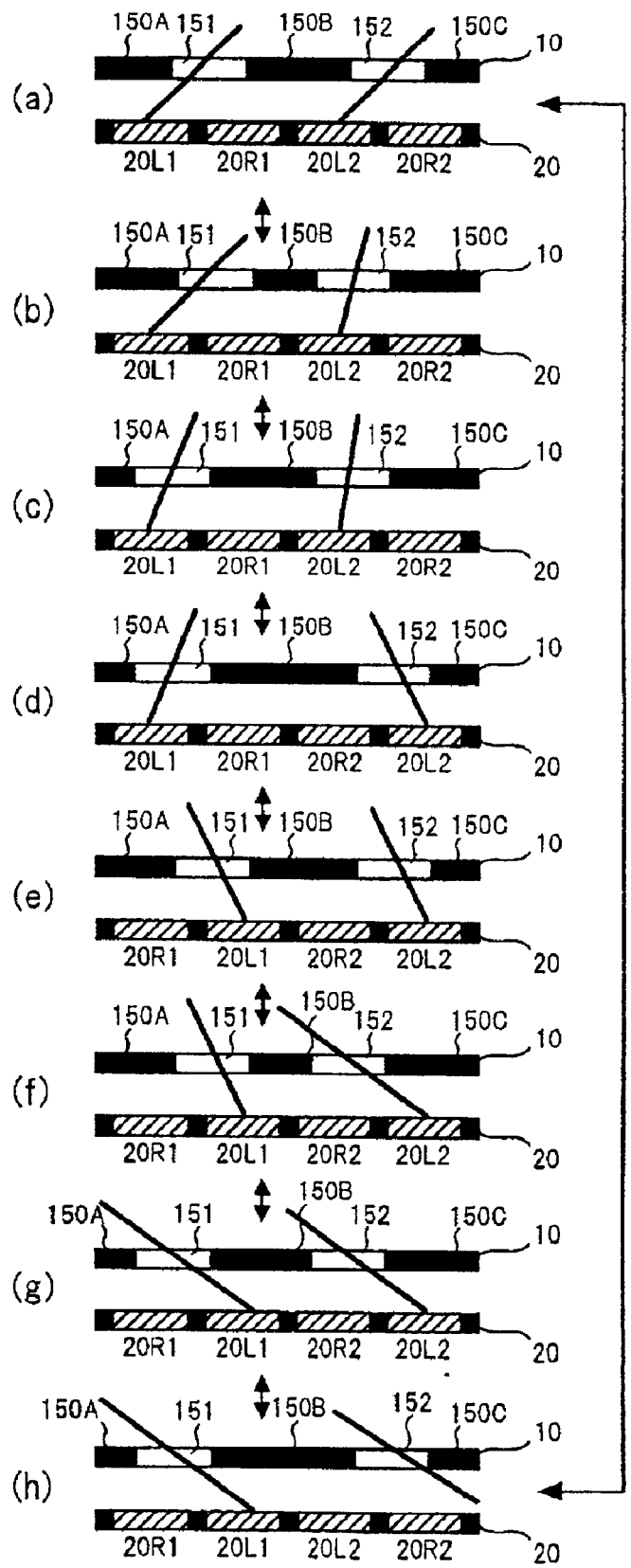
FIG. 35 is a schematic view illustrating relation between the shading barrier and the pixel on the liquid crystal panel when the viewer shifts to the left in a position near the optimum position.
Figure 36:
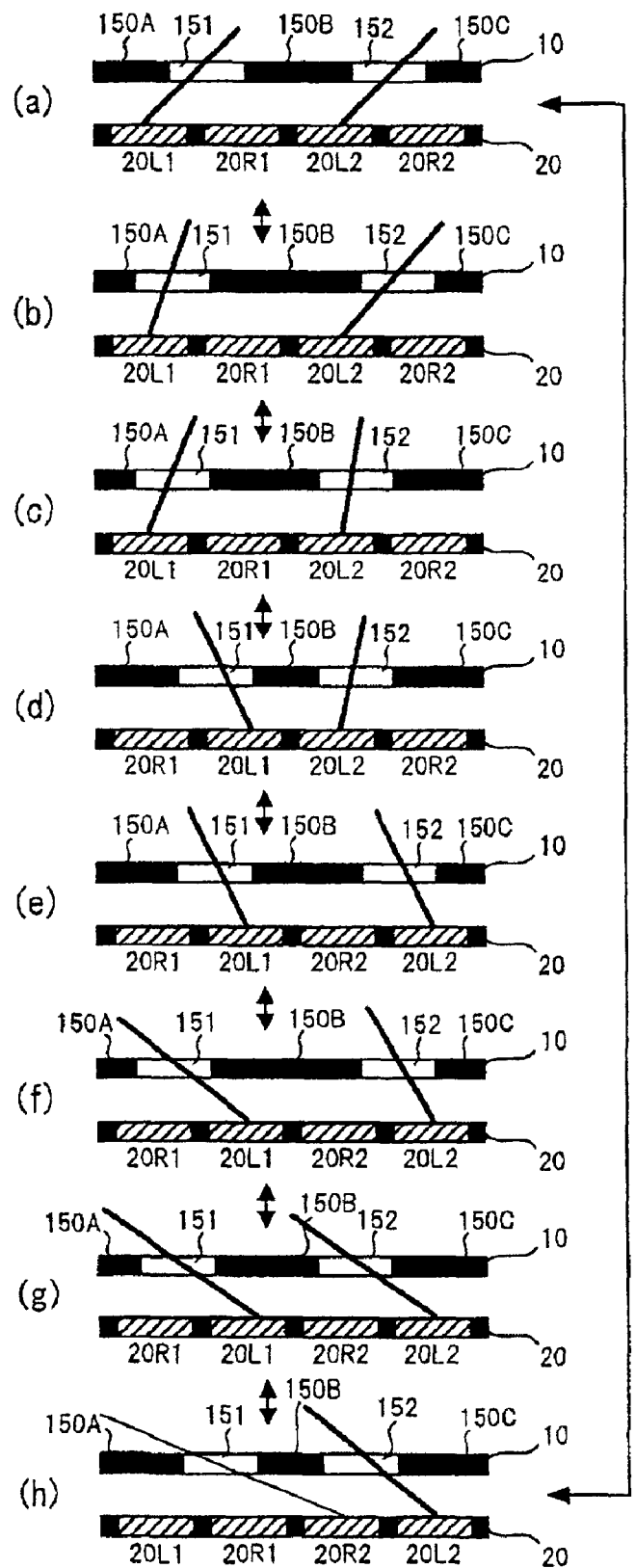
FIG. 36 is a schematic view illustrating a relation between the shading barrier and the pixel on the liquid crystal panel when the viewer shifts to the left in a position farther from the optimum position.

Explanation is made on this embodiment by referring to FIGS. 35, 36. In FIGS. 35, 36, left and right side apertures are separately controlled, leaving the shading part 150B as a boundary. Therefore widths of the apertures 151, 152 do not change. In order to control in such the manner, the transparent electrodes for indicating before or after shifting of the shading part 150B may be formed so as to belong to separate adjacent groups when forming the transparent electrodes.

FIG. 35 illustrates an example that the viewer shifts to the left in a position closer than the optimum viewing position. The aperture 152 on a right side of the boundary 150B shifts first. Explanation is made in accordance with FIGS. 35(a), (b) . . . (h) when the viewer shifts to the left sequentially. The shading part shifts to the left from FIG. 35(a) to FIG. 35(h), and the shading part shift to the left further, the state returns to FIG. 35(a) again.

In FIG. 35(a), pixels are normally observed through the apertures 151, 152. When the viewer shifts to the left, the aperture 152 shifts to the left as shown in FIG. 35(b). At that time, although a width of the aperture 152 does not change and a width of the shading part 150B becomes little narrow, the pixels are observed almost normally.

In FIG. 35(c), the aperture 151 shifts. In this state, normal viewing is achieved. In FIG. 35(d), a width of the aperture 152 does not change and normal viewing is achieved. The pixels 20R2 and 20L2 are replaced.

In FIG. 35(e), the pixels 20R1, 20L1 are replaced and the shading part 150A returns to the original state and normal viewing is achieved.

In FIG. 35(f), the aperture 152 shifts again but a width of the aperture does not change and the normal viewing is achieved. In FIG. 35(g), the shading part 150A shifts but a width of the aperture does not change and the normal viewing is achieved. In FIG. 35(h), the aperture returns to the original position and the pixels 20L2 and 20R2 are replaced and return to the original positions. In these positions, the width of the aperture 152 does not also change and the normal viewing is achieved. Then the positions return to the position of FIG. 35(a).

FIG. 36 illustrates an example that the viewer shifts to the left in a position farther than the optimum viewing position. The aperture 151 on a left side of the boundary 150B shifts first. Explanation is made in accordance with FIGS. 36(a), (b) . . . , (h) when the viewer shifts to the left sequentially. The shading part shifts to the left from FIG. 36(a) to FIG. 36(h), and the shading part shift to the left further to return to the state in FIG. 36(a) again.

In FIG. 36(a), pixels are normally observed through the apertures 151, 152. When the viewer shifts to the left, the aperture 151 shifts to the left as shown in FIG. 36(b). At that time, although a width of the aperture 152 does not change and a width of the shading part 150B becomes little broader, the pixels are observed almost normally.

In FIG. 36(c), the aperture 152 shifts. In this state, normal viewing is achieved. In FIG. 36(d), the aperture 151 shifts. A width of the aperture 152 does not change and normal viewing is achieved. The pixels 20R1 and 20L1 are replaced.

In FIG. 36(e), the aperture 152 shifts, the pixels 20R2, 20L2 are replaced, and the shading part 150A returns to the original state and normal viewing is achieved.

In FIG. 36(f), the aperture 152 shifts again but a width of the aperture does not change and normal viewing is achieved. In FIG. 36(g), the aperture 152 shifts but the width of the aperture does not change and normal viewing is achieved. In FIG. 36(h), the aperture returns to the original position and the pixels 20L1 and 20R1 are replaced and returns to the original positions. In these positions, the width of the aperture 151 does not also change and normal viewing is achieved. Then the positions returns to FIG. 36(a).

In order not to change a width of the aperture on a boundary part, as shown in FIG. 34, the transparent electrodes 15c1, 15c2 may be divided into groups so as to belong to a same group. In this case, the transparent electrode 15c1 does not form a pair with the electrode 15a1 but forms with the electrode 15a2 to form the aperture. When an alternating voltage is applied to the transparent electrode 15c2, a voltage of 0V is applied to the transparent electrode 15c1. When the alternating voltage is applied to the transparent electrode 15c1, the voltage of 0V is applied to the transparent electrode 15c2. Controlling so as not to change the aperture on the boundary part is achieved by changing the transparent electrode to be applied with a voltage.

The above explanation is only about stereoscopic viewing (supplying a stereoscopic image), a partial two-dimensional image display is possible by opening the barrier for either of the divided areas (total transmission; in this case all the shading part is structured by liquid crystal shutters) and displaying a normal two-dimensional image on an area of the liquid crystal display panel corresponding to the area. Needless to say, it is possible to display a two-dimensional image on the whole areas.

As described above, a stereoscopic image display device according this invention ensures stereoscopic viewing even in a position apart from an optimum position in back and forth directions by dividing shading means into areas in a horizontal direction and controlling shifting of the shading part in each of the areas depending on a head position of a viewer. In addition, the stereoscopic image display device securely ensures stereoscopic view from any position of the viewer by dividing a display part of an image display means depending on division into areas of the shading means and controlling a display order of a left eye image and a right eye image in stripe shapes in each of the areas depending on a head position of the viewer. The viewer can view a stereoscopic image even in a position considerably apart from the optimum position in back and forth directions by increasing the number of areas to be divided.

Although the present invention has been described and illustrated in detail, it is clearly understood that the same is and example only and is not to be taken by way of limitation by way of illustration, the spirit and scope of the present invention being limited only by the terms of the appended claims.

What is claimed is:

1. An autostereoscopic image display device comprising:
   an image display means for displaying a left eye image and a right eye image in alternately forming stripe-shaped patterns upon a liquid crystal display panel;
   a sensor for sensing a position of a head of a viewer;
   a shading means comprising a plurality of continuous shading parts and liquid crystal shutters provided on both sides of the continuous shading part, the liquid crystal shutters turning on and off based upon the position of the head of the viewer to generate a binocular parallax effect; and area shifting and division control means for dividing the shading means into areas in a horizontal direction and independently controlling shifting of said liquid crystal shutters in each of the areas, each area including a plurality of continuous shading parts, wherein the viewer can view a stereoscopic image when the head position of the viewer is out of an optimum position from the image display means.

2. The autostereoscopic image display device according to claim 1, wherein the shading means is so structured that a position of the shading part shifts by ¼ pitch of a pitch of the shading part.

3. The autostereoscopic image display device according to claim 1, wherein a shading barrier dividing control circuit divides a display part of the image display means into areas to correspond to the divided areas of the shading means and controls a display order of the left eye image and the right eye image in each of the divided areas depending on the position of the head of the viewer.

4. The autostereoscopic image display device according to claim 1, wherein the image display means comprises the liquid crystal display panel, the shading means is a shading barrier arranged between the liquid crystal display panel and a light source for emitting light in a flat shape arranged on a back side of the liquid crystal display panel.

5. The autostereoscopic image display device according to claim 1, wherein the shading means is a parallax barrier arranged on a light emission side of the image display means.

6. The autostereoscopic image display device according to claim 1, wherein the shading means comprises a liquid crystal panel.

7. The autostereoscopic image display device according to claim 1, wherein the number of divided areas increases as the head position of the viewer moves further away from an optimum viewing position.

8. The autostereoscopic image display device according to claim 1, wherein the divided areas are divided uniformly.

9. The autostereoscopic image display device according to claim 1, wherein control of each of the divided areas is provided so as to supply an image for a dominant eye to the dominant eye of the viewer, when the viewer is outside the optimum viewing range for both eyes.

10. The autostereoscopic image display device according to claim 1, wherein the shading means further comprises an optional area, wherein the continuous shading part in the optional area is formed with a liquid crystal shutter so as to display a two-dimensional image on a display area corresponding to the optional area.

11. An autostereoscopic image display device comprising:

an image display means for displaying a left eye image and a right eye image in alternately forming stripe-shaped patterns upon a liquid crystal display panel;

a sensor for sensing a position of a head of a viewer;

a shading means comprising a continuous shading part and liquid crystal shutters provided on both sides of the continuous shading part, the liquid crystal shutters turning on and off based upon the position of the head of the viewer to generate a binocular parallax effect; and area shifting and division control means for dividing the shading means into at least two areas in a horizontal direction and independently controlling shifting of said liquid crystal shutters in each of the areas, each area including at least one continuous shading part, wherein the viewer can view a stereoscopic image when the head position of the viewer is out of an optimum position from the image display means, and wherein apertures having aperture width are provided on the shading means for permitting a viewer to observe images formed by pixels displayed on the liquid crystal display panel, the aperture widths are maintained at a uniform width by setting a boundary edge of divided areas of the shading means at one of the continuous shading parts.

12. The autostereoscopic image display device according to claim 11, wherein the liquid crystal shutter provided on both the first and the second sides of the continuous shading part sandwiching the aperture part which is equivalent to the boundary edge of each divided area is wired so as to be assigned in a same group of the liquid crystal shutter in an area adjacent to each divided area.

* * * * *